United States Patent [19]

Finch

[11] 4,311,289
[45] Jan. 19, 1982

[54] MODIFICATIONS TO JET AIRCRAFT HAVING AFT FUSELAGE-MOUNTED NACELLES OVERLAPPING THE WING ASSEMBLIES

[75] Inventor: Thomas Finch, San Antonio, Tex.

[73] Assignee: The Dee Howard Company, San Antonio, Tex.

[21] Appl. No.: 941,349

[22] Filed: Sep. 11, 1978

[51] Int. Cl.³ .................. B64D 27/02; B64C 3/10
[52] U.S. Cl. ............................. 244/55; 244/35 R; 244/198; 244/130
[58] Field of Search ............ 244/54, 55, 35 R, 123, 244/130, 198, 200

[56] References Cited

U.S. PATENT DOCUMENTS

| | | | |
|---|---|---|---|
| 2,165,482 | 7/1939 | Hovgard | 244/35 R |
| 2,709,052 | 5/1955 | Berg | 244/35 R |
| 3,952,971 | 4/1976 | Whitcomb | 244/198 |
| 4,050,651 | 9/1977 | Neal et al. | 244/35 R |
| 4,121,787 | 10/1978 | Wilby | 244/200 |

OTHER PUBLICATIONS

"Citation 500 Mod by Astec: $170 Gs", NBAA Convention News, Sep. 27, 1977, Houston, Texas.
"Cessna Mod Promises More Speed, Range", Daily News, Sep. 29, 1977.

*Primary Examiner*—Charles E. Frankfort
*Attorney, Agent, or Firm*—Pollock, Vande Sande & Priddy

[57] ABSTRACT

Modifications to a jet aircraft of the type having aft fuselage-mounted engine nacelles overlapping trailing edge portions of the aircraft's wings, wherein a channel area defined by the fuselage, wing, pylon and attached nacelle is shaped to prevent air flowing therethrough from forming a shock wave during flight operation in the transonic regime, resulting in significant drag reduction as compared to an unmodified jet aircraft of a similar type. Further modifications to the jet aircraft's wings provide additional lift while significantly reducing drag as compared to a similar, unmodified aircraft. The present invention is particularly adaptable for use with Gates Learjet type aircraft, especially Models 23, 24, 25 and other models having similar nacelle, pylon and inboard wing arrangements.

49 Claims, 23 Drawing Figures

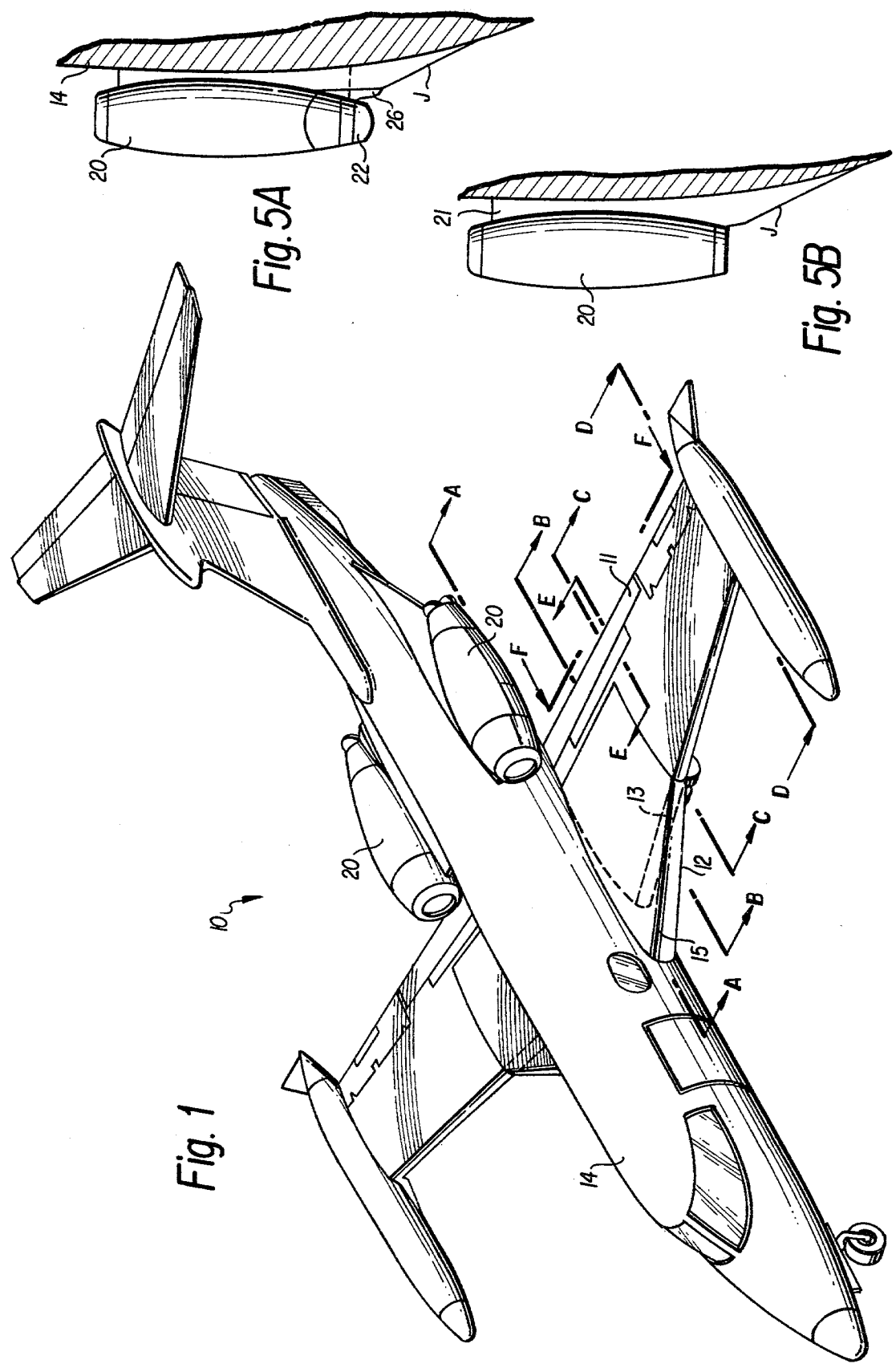

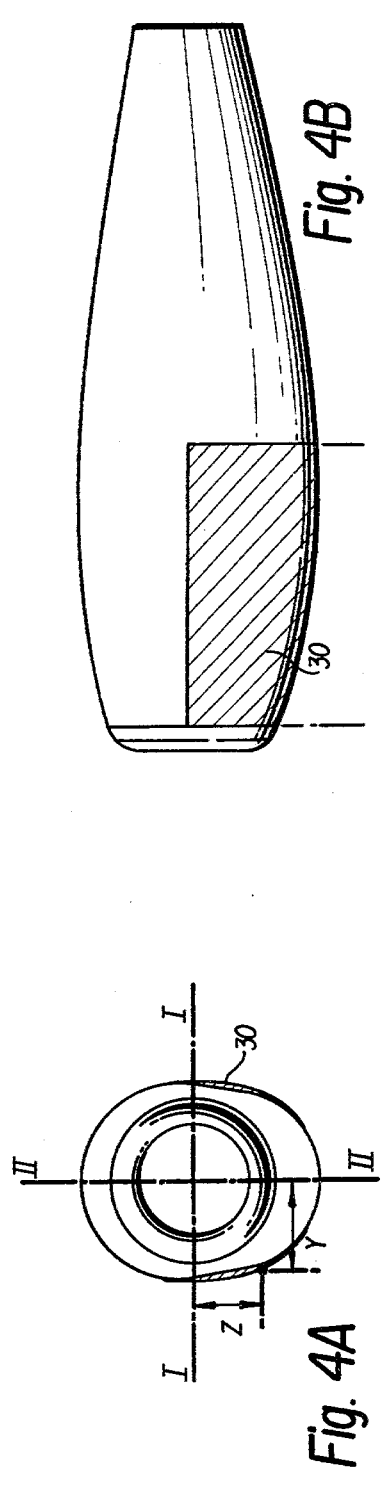
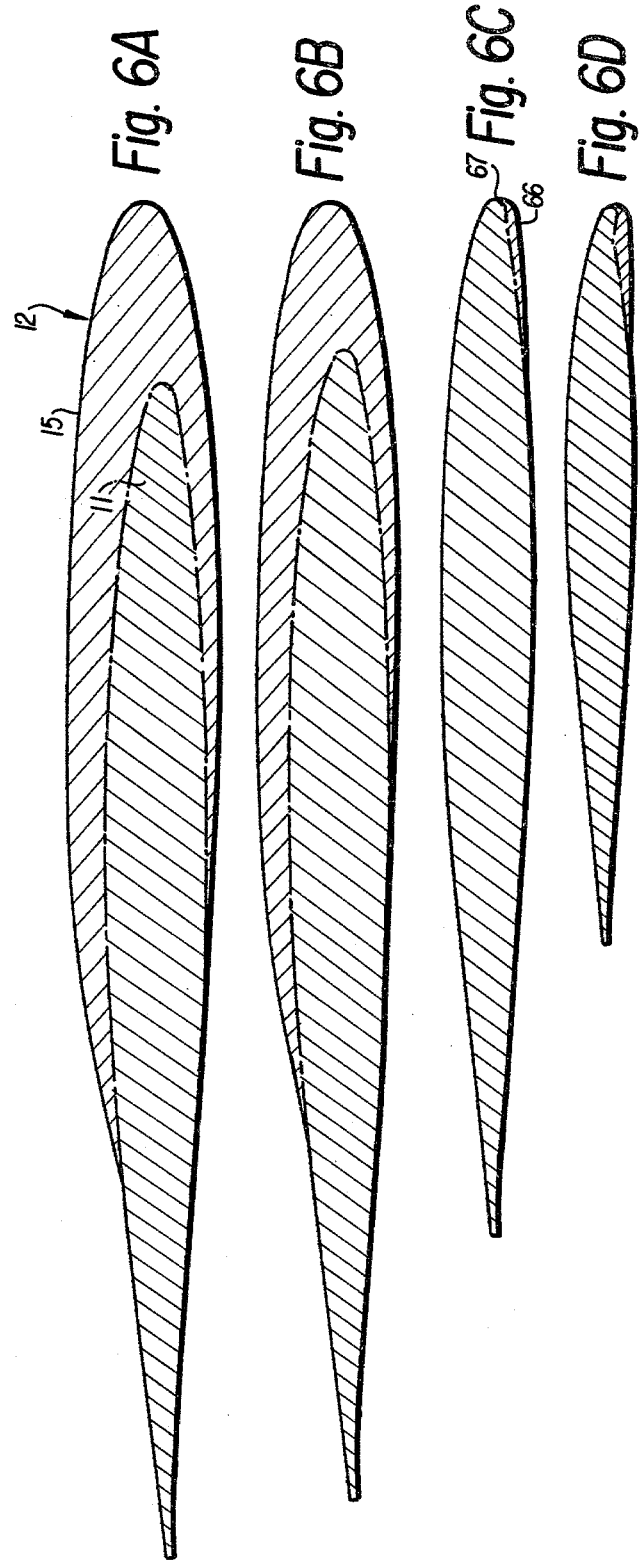

MODIFICATIONS TO JET AIRCRAFT HAVING AFT FUSELAGE-MOUNTED NACELLES OVERLAPPING THE WING ASSEMBLIES

BACKGROUND OF THE INVENTION

The present invention generally relates to modifications for jet aircraft of the type having aft fuselage-mounted engine nacelles which overlap the trailing edge portions of the aircraft's wings. In particular, the present invention is directed to aircraft modifications adaptable for use with Gates Learjet type aircraft, especially Models 23, 24 and 25, by providing an essentially subsonic aerodynamic flow path through a channel area defined by the fuselage, wing, pylon and attached engine nacelle, during flight in the transonic regime, i.e. $0.75 \leq M \geq 0.83$. The essentially subsonic air flow eliminates the possibility of a shock wave forming in the channel during high speed flight. The present invention is further directed to wing modifications for increasing the lift generated by the sustaining airfoil, while reducing drag generated during operation of the aircraft.

Extensive tests of an unmodified Gates Learjet type aircraft (Model 24, Serial Number 150) have shown that increased drag and the corresponding reduction in lift generated during transonic flight ($M \geq 0.75$) of this aircraft tend to adversely increase its rate of fuel consumption. Furthermore, the adverse combination of increased drag and reduced lift contribute to the difficulty in maintaining level flight at altitudes of 50,000 feet or more M.S.L. as reported in *Professional Pilot Magazine*, March 1978, pages 40-44.

Applicant has determined that a major cause of increased drag for an unmodified Gates Learjet type aircraft operating in the transonic regime can be attributed to a converging-diverging channel defined by the fuselage, trailing edge portion of the wing, and the overlapping portion of the engine nacelle and pylon assembly. Air is caused to accelerate over the leading edge of the wing surface in a conventional manner, generating lifting forces for sustaining flight of the aircraft. As the accelerated air passing over an inboard portion of the wing enters the channel, it attempts to maintain a continuum in spite of the changing shape of the channel. This causes the air to accelerate until it reaches and exceeds the speed of sound, or $M=1$, substantially at the position of the channel throat, at which time a shock wave is generated within the converging-diverging channel by separation of the highly accelerated air. The shock wave acts as a plug within the channel, diverting upstream air around the outer surfaces of the nacelle and pylon assembly, creating turbulent air flow about the nacelle pylon assembly which greatly increases the level of drag generated during transonic flight of the aircraft.

One solution disclosed herein is to re-design the converging-diverging channel to entirely converge, rather than diverge through an aft portion. This solution is not completely effective, however, in that an entirely convergent channel will, itself, generate an increased amount of drag by effectively increasing the frontal area of the aircraft.

Applicant's preferred solution to the channel drag problem recognizes the importance of retaining a converging-diverging channel, while at the same time preventing the formation of a shock wave therein. Specifically, applicant has modified the original diverging channel to reduce, but not eliminate, the degree of divergence.

Conveniently, in a preferred embodiment of the present invention, the lower surface of the nacelle pylon assembly, which defines a portion of the channel, has been modified to reduce the channel divergence while maintaining substantially smooth, continuous flow lines therethrough. In addition, a cheek surface portion of the engine nacelle forming a wall of the channel has been reduced in diameter to increase the throat area of the channel and thus decrease the overall degree of divergence.

The standard Gates Learjet type wing can be derived from the NACA 64A-109 airfoil section, wherein: "6" designates the NACA series; "4" designates a chord-wise position of minimum pressure expressed in tenths of the chord; "A" designates an airfoil that is substantially straight from about eighttenths of the chord to the trailing edge; "1" designates a design lift coefficient in tenths; and "09" expresses the thickness of the wing as a percent of chord. As air flows over an inboard section of the unmodified Learjet wing having this particular airfoil type and moving at transonic speeds, the air quickly accelerates and the pressure coefficient tends to exceed the critical negative value over the frontal portion of the wing, indicating that the air has achieved supersonic velocities in this area. The coefficient of pressure then becomes less negative and actually goes positive over a generally chord-wise middle section of the wing. The air then again picks up speed, causing the coefficient of pressure to achieve a high, though subcritical, negative value just prior to entry into the channel. The higher the negative coefficient of pressure, the greater the speed of the air, while a positive coefficient of pressure indicates relatively low speed air flow. With regard to the existing Learjet type wing as derived from NACA 64A-109 airfoil section, the air is caused to increase speed dramatically over the frontal and aft portions of the wing, while drastically reducing speed over the middle wing portion. As a result, the desirable lifting force indicated by the negative pressure coefficients is adversely affected by the positive or downward force generated in the area generally forward of the nacelle and indicated by the less negative and positive coefficients of pressure.

In comparison, applicant's invention includes a modified inboard portion of the airfoil which functions to continuously decelerate the air flowing over the wing in a substantially smooth manner from the high speed flow over the frontal portion of the wing to a much slower speed flow over the remaining portion of the wing, thereby helping ensure that the flow entering the channel remains essentially subsonic. The unique shape of the modified inboard wing also completely eliminates the undesirable downwardly directed force which adversely affects unmodified aircraft of this type.

A further problem facing aircraft of the unmodified Learjet type is recompression or rejoining of the downstream air after passage of the aircraft therethrough. It is considered desirable to leave the downstream air in a completely undisturbed state to minimize the profile drag generated by turbulent air flow. In the Gates Learjet type aircraft, a negative net pressure imbalance exists across a trailing portion of the nacelle pylon which generates increased drag, while also providing a resultant upward pressure against the pylon, which can adversely affect the force generated by the horizontal stabilizer.

Applicant's invention conveniently overcomes the problems of recompression by extensively modifying the top and bottom surfaces of the nacelle pylon, whereby a substantially balanced coefficient of pressure of between 0 and +0.1 Cp is generated over substantially the trailing 30% of the modified pylon structure. The substantially balanced pressure forces as indicated by the low net Cp value, function to reduce the drag at flight speeds of up to $M=0.82$, ensuring maximum thrust recovery. Furthermore, because the Cp values remain positive, adverse pressure on the horizontal stabilizer is eliminated.

As will be discussed in detail hereafter, applicant's new and useful invention solves the aforestated problems as well as additional problems confronting known Learjet type aircraft, while at the same time providing an aircraft aerodynamically capable of cruising at high altitudes in excess of 51,000 feet, and reducing drag generated during transonic flight (i.e. $0.75 \leq M \geq 0.80$) by up to 17% as compared to an unmodified Learjet type aircraft operating under similar conditions.

OBJECTS AND SUMMARY OF THE PRESENT INVENTION

An object of the present invention is to provide a modified Learjet type aircraft including a converging-diverging channel defined by the fuselage, a trailing edge portion of the wing, and an overlapping an portion of the engine nacelle assembly which is attached to the fuselage via a pylon assembly, wherein the modified channel prevents the formation of shock waves therein, to significantly reduce drag during transonic flight.

A further object of the present invention is to provide a modified nacelle pylon assembly for a Learjet type aircraft, wherein a positive net coefficient of pressure of between 0 and +0.1Cp is generated over substantially the trailing 30% of the pylon structure.

A further object of the present invention is to provide a modified hollow glove assembly for a Learjet type aircraft, wherein the glove assembly surrounds an inboard portion of an existing wing, with the glove assembly having a specific shape designed to prevent an adverse downwardly directed force from occurring over an upper surface of the glove, with the glove also smoothly decelerating the air as it enters the convergent-divergent channel area between the fuselage and nacelle.

Another object of the present invention is to provide a modified wing assembly for a Learjet type aircraft, wherein the trailing edge of the wing is increased in thickness, with the thickened trailing edge portion blending smoothly into the existing airfoil surface, and wherein the new thickness is between 0.001 and 0.010 times the chord length of the unmodified wing section, wherein the thickened trailing edge acts to reduce the air flow boundary layer thickness, resulting in a corresponding reduction in drag.

A further object of the present invention is to provide a modified nacelle pylon assembly capable of providing non-turbulent recompression of the air flowing thereabout.

A further object of the present invention is to provide the hollow glove assembly for attachment about a conventional Learjet type wing section, wherein an area enclosed by the glove assembly is adaptable for use as an additional fuel tank for the aircraft.

These and other objects of the present invention are achieved in a preferred embodiment of the present invention, wherein an unmodified Learjet type aircraft is significantly modified, reducing the drag generated during transonic flight by up to 17%, as well as increasing the lifting capability of the aircraft and increasing the thrust recovery during recompression. Specifically, the converging-diverging channel defined by the fuselage, wing and nacelle assembly of a Learjet type aircraft is modified by changing the shape of the pylon surface to reduce the total divergence of the channel. Furthermore, the outer surface of the nacelle cheek is modified to increase the throat area of the channel and the inboard wing surface is reshaped to decelerate the speed of the air entering the channel.

In particular, the ratio of the channel exit area to the minimum cross-sectional area of the channel, generally occurring at the throat, provides an area ratio for the converging-diverging channel. In the unmodified Learjet type aircraft, the area ratio has been measured to be at least 1:1.1, wherein the channel formed according to the present invention exhibits an area ratio no greater than 1:1.065. Applicant has determined that a shock wave can be prevented during transonic flight provided an area ratio of 1:1.065 or less is maintained. Any greater area ratio will allow excessively supersonic air flow through the channel, resulting in the formation of a shock wave, resulting in a significant increase in drag.

The preferred embodiment also includes a modified upper pylon surface which causes air flowing over the pylon assembly to remain subsonic over a greater distance, substantially reducing the total drag generated when the air flow eventually goes supersonic.

The upper and lower pylon surfaces are respectively contoured to generate a positive net coefficient of pressure between 0 and +0.1 Cp over the trailing portion of the pylon assembly.

The present invention further includes a hollow, aerodynamically shaped glove assembly extending about an inboard portion of a Learjet type aircraft wing. The glove assembly includes an enlarged radius of curvature as compared to the radius of curvature of the original wing section, and the hollow area enclosed is capable of functioning as an additional fuel tank for the aircraft. Furthermore, the glove assembly is aerodynamically shaped to prevent negative lift from being generated by air flowing thereover, and the glove is further shaped to decelerate the air flow in a substantially gradual manner prior to entry into the downstream channel. The preferred embodiment also includes a modified outboard wing section for a Learjet type aircraft, wherein the trailing portion of the wing surface is thickened between 0.001 and 0.010 times the chord length of the unmodified wing section, with a preferred value being 0.005 times the corresponding chord length. The thickened trailing edge functions to provide the air flowing over the wing with a reduced boundary layer thickness, with the reduced thickness acting to decrease the drag generated by movement of the wing through the air.

In an alternative embodiment of the present invention, the glove assembly is eliminated and an aerodynamically shaped member is attached to a portion of the fuselage substantially opposite the nacelle assembly, with the fuselage modification providing a less divergently shaped channel to maintain essentially subsonic air flow therethrough.

While the present invention has been described with respect to modifications made to a Learjet type aircraft for the sake of example, applicant's invention is adaptable for use with any jet aircraft having aft fuselage mounted engine nacelles overlapping the trailing wing edge to form a channel, and operating at flight speeds in the transonic regime.

A clearer understanding of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein:

FIG. 1 shows an isometric view of an aircraft (i.e. of the Gates Learjet type) including modifications formed in accordance with the present invention;

FIGS. 4A and 4B show front and side views of the engine nacelle formed in accordance with the embodiment of FIG. 1;

FIGS. 5A and 5B show the specific pylon shapes with and without a thrust reverser attached to the nacelle assembly;

FIGS. 6A, 6B, 6C and 6D are cross-sectional views of a modified wing formed in accordance with the present invention taken substantially along the lines A—A, B—B, C—C and D—D, respectively, in FIG. 1;

DESCRIPTION OF THE PREFERRED EMBODIMENTS

Figure 2B:
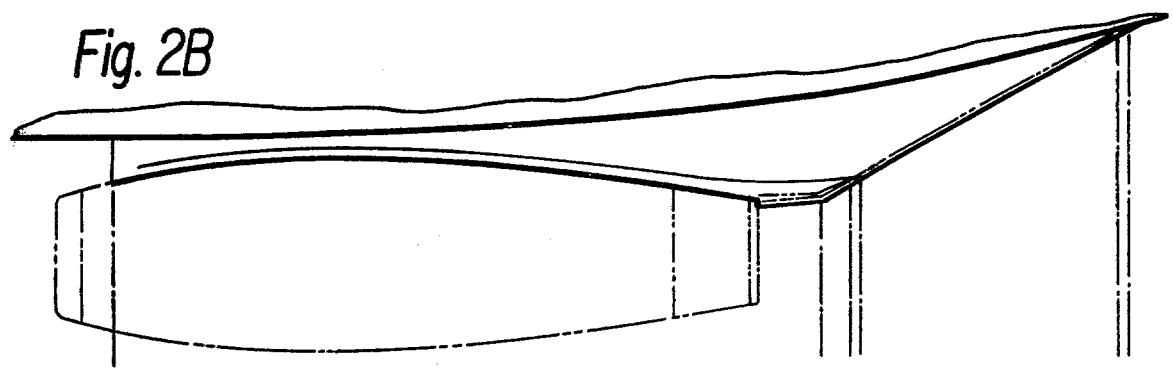
FIGS. 2A and 2B each show enlarged views of a portion of the aircraft of FIG. 1, including side and top views of the pylon assembly modifications.

Referring to the drawings, and FIG. 1 in particular, a conventional T-tailed jet aircraft modified in accordance with the present invention is generally indicated at 10. Preferably, the aircraft is of the Gates Learjet type.

Aircraft 10 includes a high performance wing generally designated at 11, formed substantially in accordance with NACA 64A-109 and including an aspect ratio of substantially 5.02 (including the span through the tip tanks); a taper ratio of substantially 0.507 and a dihedral angle of substantially 2.5°. The standard NACA 64A-109 airfoil is defined in a table appearing in Col. 5 of U.S. Pat. No. 4,050,651 issued Sept. 27, 1977 to Neal et al, which patent is incorporated herein by reference thereto.

As best shown in FIGS. 1 and 6A, a hollow, aerodynamically shaped glove assembly 12 surrounds and is attached to an inboard portion 13 of wing 11 via mechanical fasteners, not shown for purposes of clarity. Glove assembly 12 extends from a fuselage 14 substantially to a wing station 82.00 in the preferred embodiment of the present invention, with a reference wing station 35.433 extending substantially adjacent to fuselage 14 of aircraft 10. Wing station 35.433 is based on a true chord length (C) of 114.525 inches and includes an angle of incidence of 0.816° above the wing reference plane as rotated about the trailing edge, and further includes a leading edge radius of substantially 0.0158C. The shape of glove 12, taken at wing station 35.433 is defined in the following Table 1, wherein the stations and ordinates are given in percent of airfoil chord C.

TABLE 1

| WING STATION 35.433 (Stations and ordinates given in percent of airfoil chord, C) | | |
|---|---|---|
| Station | Upper Surface Ordinate | Lower Surface Ordinate |
| 0.00 | 0.00000 | −0.00000 |
| 0.25 | 0.00856 | −0.00849 |
| 0.50 | 0.01170 | −0.01161 |
| 1.00 | 0.01602 | −0.01563 |
| 1.50 | 0.01912 | −0.01864 |
| 2.00 | 0.02174 | −0.02104 |
| 3.00 | 0.02580 | −0.02480 |
| 4.00 | 0.02908 | −0.02781 |
| 5.00 | 0.03191 | −0.03034 |
| 6.50 | 0.03554 | −0.03362 |
| 8.00 | 0.03873 | −0.03641 |
| 10.00 | 0.04248 | −0.03960 |
| 12.00 | 0.04558 | −0.04217 |
| 13.50 | 0.04766 | −0.04379 |
| 15.00 | 0.04951 | −0.04532 |
| 17.50 | 0.05230 | −0.04733 |
| 20.00 | 0.05462 | −0.04907 |
| 25.00 | 0.05828 | −0.05104 |
| 30.00 | 0.06165 | −0.05178 |
| 35.00 | 0.06357 | −0.05091 |
| 40.00 | 0.06409 | −0.04920 |
| 45.00 | 0.06361 | −0.04648 |
| 50.00 | 0.06214 | −0.04313 |
| 55.00 | 0.05885 | −0.03921 |
| 59.17 | 0.05427 | −0.03532 |
| 60.00 | 0.05313 | −0.03473 |
| 65.00 | 0.04414 | −0.03082 |
| 70.00 | 0.03314 | −0.02658 |
| 73.20 | 0.02711 | −0.02379 |
| 75.00 | 0.02519 | −0.02218 |
| 80.00 | 0.02061 | −0.01786 |

TABLE 1-continued

WING STATION 35.433
(Stations and ordinates given in percent of airfoil chord, C)

| Station | Upper Surface Ordinate | Lower Surface Ordinate |
|---|---|---|
| 85.00 | 0.01554 | −0.01345 |
| 90.00 | 0.01039 | −0.00908 |
| 91.00 | 0.00936 | −0.00823 |
| 92.00 | 0.00834 | −0.00743 |
| 93.00 | 0.00738 | −0.00675 |
| 94.00 | 0.00633 | −0.00609 |
| 95.00 | 0.00537 | −0.00557 |
| 96.00 | 0.00437 | −0.00511 |
| 97.00 | 0.00339 | −0.00476 |
| 98.00 | 0.00238 | −0.00457 |
| 99.00 | 0.00140 | −0.00444 |
| 99.947 | — | −0.00467 |
| 100.00 | 0.00035 | — |

In comparison, wing station 82.00 is based on a wing reference plane chord length of 87.528 inches, including a leading edge radius of 0.014852C, with the angle of incidence above the wing reference plane being 0°. The lower surface ordinate effectively terminates at substantially station 99.947, with no upper surface measurement being taken at the station. As with wing station 35.433, the shape of the wing section is defined by the following Table 2, wherein the stations and ordinates are given in percent of airfoil chord C.

TABLE 2

WING STATION 82.00
(Stations and ordinates given in percent of airfoil chord, C)

| Station | Upper Surface Ordinate | Lower Surface Ordinate |
|---|---|---|
| 0.00 | −0.00754 | −0.00754 |
| 0.25 | +0.00068 | −0.01599 |
| 0.50 | 0.00354 | −0.01874 |
| 1.00 | 0.00714 | −0.02171 |
| 1.50 | 0.00988 | −0.02342 |
| 2.00 | 0.01205 | −0.02445 |
| 3.00 | 0.01565 | −0.02616 |
| 4.00 | 0.01851 | −0.02748 |
| 5.00 | 0.02102 | −0.02845 |
| 6.50 | 0.02445 | −0.02948 |
| 8.00 | 0.02719 | −0.03034 |
| 10.00 | 0.03062 | −0.03119 |
| 12.00 | 0.03359 | −0.03199 |
| 13.50 | 0.03553 | −0.03256 |
| 15.00 | 0.03736 | −0.03302 |
| 17.50 | 0.03999 | −0.03359 |
| 20.00 | 0.04239 | −0.03405 |
| 22.50 | — | −0.03464 |
| 25.00 | 0.04627 | −0.03576 |
| 30.00 | 0.04878 | −0.03725 |
| 35.00 | 0.05050 | −0.03816 |
| 40.00 | 0.05113 | −0.03827 |
| 45.00 | 0.05050 | −0.03713 |
| 50.00 | 0.04878 | −0.03519 |
| 55.00 | 0.04621 | −0.03268 |
| 59.17 | 0.04341 | −0.03005 |
| 60.00 | 0.04296 | −0.02948 |
| 65.00 | 0.03884 | −0.02605 |
| 70.00 | 0.03416 | −0.02239 |
| 73.20 | 0.03096 | −0.01999 |
| 75.00 | 0.02913 | −0.01874 |
| 80.00 | 0.02354 | −0.01508 |
| 85.00 | 0.01771 | −0.01137 |
| 90.00 | 0.01188 | −0.00794 |
| 91.00 | 0.01076 | −0.00725 |
| 92.00 | 0.00965 | −0.00662 |
| 93.00 | 0.00846 | −0.00603 |
| 94.00 | 0.00732 | −0.00556 |
| 95.00 | 0.00619 | −0.00516 |
| 96.00 | 0.00504 | −0.00488 |
| 97.00 | 0.00394 | −0.00468 |
| 98.00 | 0.00280 | −0.00457 |
| 99.00 | 0.00171 | −0.00463 |

TABLE 2-continued

WING STATION 82.00
(Stations and ordinates given in percent of airfoil chord, C)

| Station | Upper Surface Ordinate | Lower Surface Ordinate |
|---|---|---|
| 99.944 | — | −0.00496 |
| 100.00 | 0.00046 | — |

As defined in Tables 1 and 2 and shown in FIG. 1, hollow glove assembly 12 provides an air foil shape having a blunted leading edge, with the upper surface ordinate of glove 12 increasing in value to approximately station 40 and then gradually tapering toward a generally thickened trailing edge. The upper and lower surfaces of glove assembly 12 are faired in a substantially smooth manner from the particular wing shape at fuselage 14 as indicated in Table 1, to the particular wing shape indicated at station 82.00 (Table 2) as shown in FIG. 1. Furthermore, the longitudinal length of glove assembly 12 smoothly tapers from a value of 114.525 inches at wing station 35.433 (compared to 99.264 inches for the comparable wing station of an unmodified Learjet airfoil) to a longitudinal length equal to the unmodified Learjet wing at wing station 82.00. Only a lower surface ordinate has been measured for stations 22.50 and 99.944, with station 22.5 substantially corresponding to the end of the modified lower wing surface at wing station 82.00.

In a similar manner, the percent change in the leading edge radius of glove 12 smoothly tapers from substantially a value of 0.0158C at wing station 35.433 to a value of substantially 0.0148C when merging with wing 11 at wing station 82.00 in the preferred embodiment of the invention. The percent change in the upper leading edge radius of wing 11 continues to taper in a smooth, continuous manner to a value of substantially 0.02085C at wing station 181.1 located substantially at the outboard end of wing member 11. After the appropriate chord lengths are inserted, it is noted in the preferred embodiment that the actual radius of curvature of the upper leading edge tapers between substantially 1.8 inches at wing station 35.433 and substantially 1.3 inches at wing station 82.00 and then continues at a substantially constant radius of 1.3 inches between stations 82.00 and 181.1, respectively.

The following Table 3 defines the shape of modified wing 11 at wing station 181.10, wherein the stations and ordinates are given in percent of airfoil chord C.

TABLE 3

WING STATION 181.10
(Stations and ordinates given in percent of airfoil chord, C)

| Station | Upper Surface Ordinate | Lower Surface Ordinate |
|---|---|---|
| 0.00 | −0.01773 | −0.01773 |
| 0.25 | −0.00770 | −0.02639 |
| 0.50 | −0.00385 | −0.02960 |
| 1.00 | 0.00080 | −0.03312 |
| 1.50 | 0.00401 | −0.03473 |
| 2.00 | 0.00666 | −0.03585 |
| 3.00 | 0.01075 | −0.03746 |
| 4.00 | 0.01412 | −0.03858 |
| 5.00 | 0.01724 | −0.03938 |
| 6.50 | 0.02101 | −0.03994 |
| 8.00 | 0.02422 | −0.03978 |
| 10.00 | 0.02791 | −0.03914 |
| 12.00 | 0.03128 | −0.03826 |
| 13.50 | 0.03337 | −0.03762 |
| 15.00 | 0.03529 | −0.03697 |
| 17.50 | 0.03826 | −0.03625 |
| 20.00 | 0.04082 | −0.03569 |

TABLE 3-continued

WING STATION 181.10
(Stations and ordinates given in
percent of airfoil chord, C)

| Station | Upper Surface Ordinate | Lower Surface Ordinate |
|---|---|---|
| 22.50 | 0.04307 | −0.03561 |
| 25.00 | 0.04491 | −0.03577 |
| 30.00 | 0.04764 | −0.03657 |
| 35.00 | 0.04949 | −0.03746 |
| 40.00 | 0.05045 | −0.03770 |
| 45.00 | 0.05005 | −0.03697 |
| 50.00 | 0.04844 | −0.03537 |
| 55.00 | 0.04588 | −0.03272 |
| 60.00 | 0.04259 | −0.02952 |
| 65.00 | 0.03866 | −0.02623 |
| 70.00 | 0.03417 | −0.02270 |
| 75.00 | 0.02927 | −0.01901 |
| 80.00 | 0.02382 | −0.01540 |
| 85.00 | 0.01813 | −0.01179 |
| 90.00 | 0.01219 | −0.00802 |
| 91.00 | 0.01107 | −0.00730 |
| 92.00 | 0.00979 | −0.00666 |
| 93.00 | 0.00866 | −0.00618 |
| 94.00 | 0.00746 | −0.00577 |
| 95.00 | 0.00642 | −0.00553 |
| 96.00 | 0.00505 | −0.00545 |
| 97.00 | 0.00401 | −0.00537 |
| 98.00 | 0.00281 | −0.00537 |
| 99.00 | 0.00160 | −0.00537 |
| 99.904 | — | −0.00545 |
| 100.00 | 0.00064 | — |

The modified wing as defined at station 181.10 is based on a wing reference plane chord length of 62.34 inches, includes an upper leading edge radius of 0.02085C and a lower leading edge radius of 0.01716C, with the center line of the upper leading edge radius occurring at station 2.101, ordinate −0.175 and center line of the lower leading edge radius occurring at station 1.732 and ordinate −0.0176, respectively. While the lower leading edge radius is substantially similar to the upper leading edge radius at wing station 82.00, the lower leading edge radius decreases in a substantially continuous manner between wing station 82.00 and 181.1, compared to the substantially constant upper leading edge radius between wing stations 82.00 and 181.00. As will be discussed in detail hereafter, the modified lower leading edge allows the air to stay attached to the wing 11 over a greater distance, resulting in a reduction of wave drag beneath wing 11.

Hollow glove assembly 12 mates with and surrounds an inboard portion 13 of wing 11 to form an enclosed area 15 which can be used as an additional fuel storage tank to provide an extended cruising range for aircraft 10. Glove 12 also serves an important function which can be best understood with reference to FIG. 13.

Figure 13:
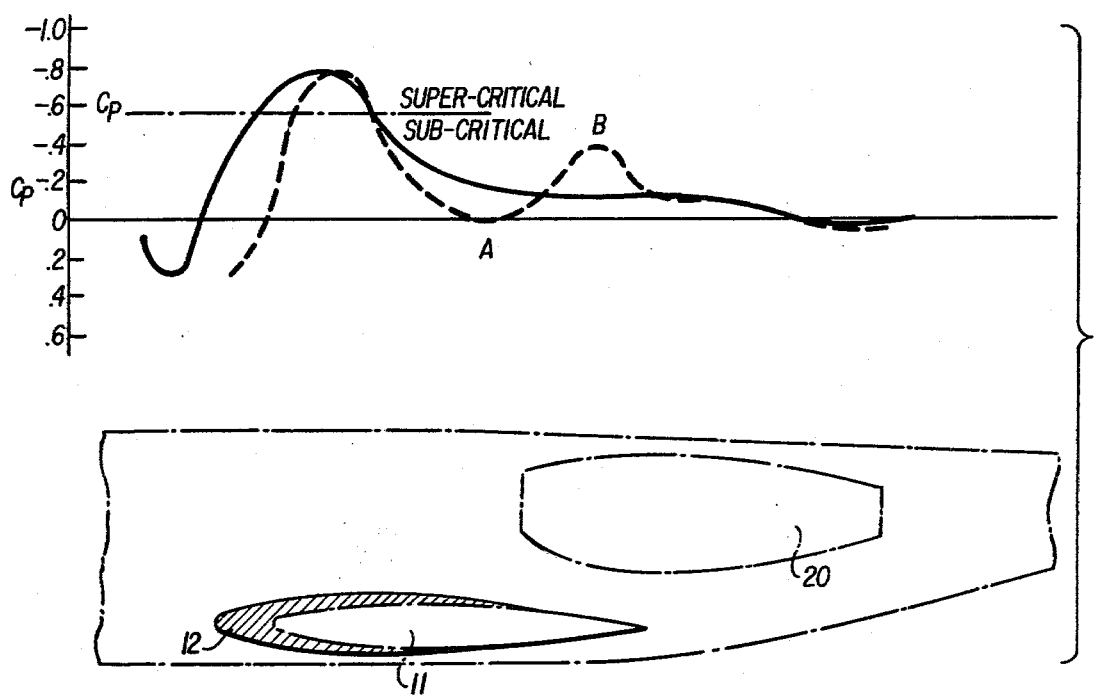
FIG. 13 shows a side view of a modified wing assembly along with a graphical representation of the changing values of the pressure coefficient Cp as measured over wing surface of a Learjet type aircraft before and after modifications to the wing surface formed in accordance with the present invention.
Figure 9:
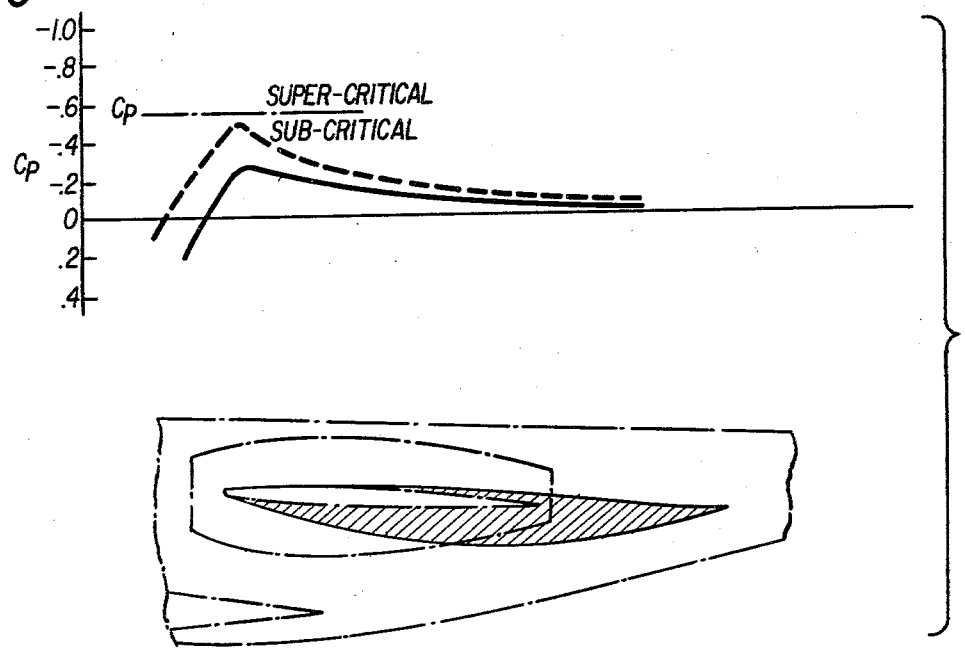
FIG. 9 is a graphical representation of the changing values of the pressure coefficient Cp as measured along the upper nacelle pylon surface of a Learjet type aircraft before and after modifications to the upper pylon surface formed in accordance with the present invention.
Figure 10:
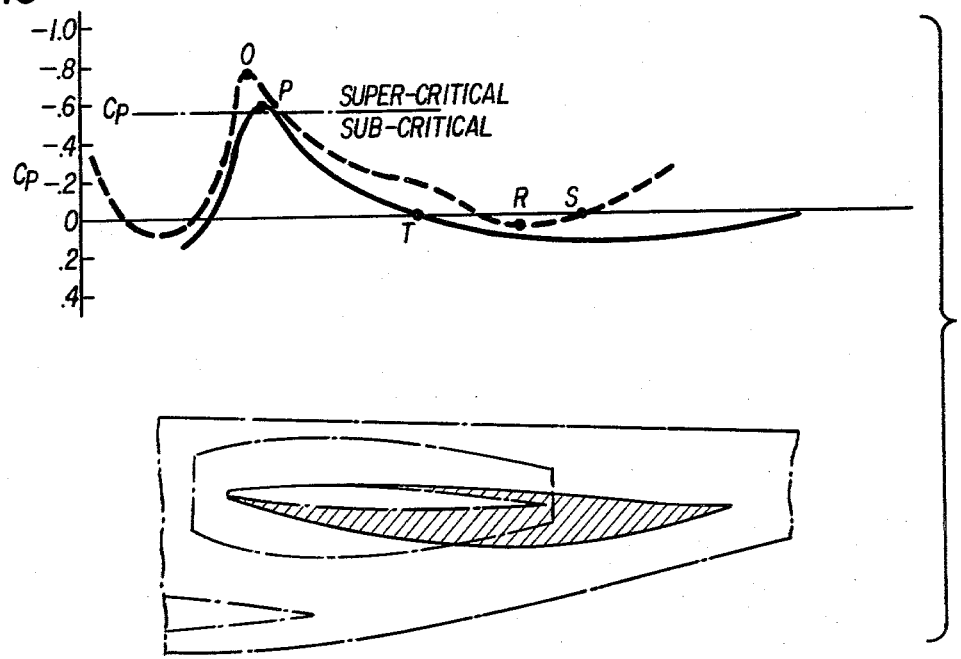
FIG. 10 is a graphical representation of the changing values of the pressure coefficient Cp as measured along the lower nacelle pylon surface of a Learjet type aircraft before and after modifications to the lower pylon surface formed in accordance with the present invention.

FIG. 13 shows a side view of the basic wing assembly 11 as modified by glove 12 and attached to fuselage 14. Also appearing is a graphical representation of the changing pressure coefficient Cp as measured along an upper surface of modified wing assembly 11, wherein each point on the graph corresponds to the measured pressure over a wing surface positioned therebelow. The dotted line represents the Cp values as determined in test flight 44 of an unmodified Gates Learjet aircraft, Model 24, Ser. No. 150, which was conducted before the attachment of glove 12. The measurement was taken at a speed M=0.803 with a lift coefficient Cl=0.3639 and was then computed to arrive at corresponding coefficient Cp for a reference speed of M=0.760. In a like manner, the solid line represents Cp values as determined by test flight 61 taken with glove 12 attached to wing 10, at a speed of M=0.805 and Cl of 0.3959 which was computed to arrive at the corresponding Cp for reference speed M=0.760. Each of the lines appearing in the graphs of FIGS. 9 and 10 are likewise computed for a reference speed of M=0.760.

FIG. 13 provides a visual comparison of the air flow over the unmodified wing 11 and the modified wing including glove 12. In particular, the dotted line represents the changing coefficient of pressure, Cp, over the unmodified wing when moving at transonic speeds, while the solid line represents the Cp over the modified wing assembly. The Cp values for both lines become increasingly negative over the upper front portion of the wing, indicative of the accelerated air flow thereover. As the Cp values exceed a super-critical level, the air tends to achieve supersonic velocities and separate from the wing, causing the formation of a shock wave and a corresponding increase in drag. While both lines in FIG. 13 exceed the super-critical level, it is important to note that the dotted line forms a much more steeply sloped curve downstream of the peak negative Cp value as compared to the solid line. The steepness of the slope is indicative of the type of shock wave, if any, which is created by the highly accelerated air. In the present case, the steeply contoured slope indicated by the dotted line will produce a shock wave while the gently contoured solid line indicates the absence of a shock wave over the wing. As a result, shock induced drag over the front portion of the wing is considerably reduced.

The Cp values represented by the dotted line become exceedingly less negative as indicated by the relatively steep slope of the dotted line and actually go positive, with a maximum value occurring substantially at point A in the graph of FIG. 13. This means that the upper surface of the conventional Learjet type wing 11 is actually feeling a downwardly directed or positive pressure against its surface which is referred to hereafter as negative lift. This is a totally undesirable condition which forces the aircraft to exert additional thrust to counteract the negative lift and maintain stable flight. Referring again to FIG. 13, the dotted line downstream of point A reverses its slope, crosses the zero line and becomes increasingly negative while approaching a point B which is located substantially within the entrance of the convergent-divergent channel formed by a portion of engine nacelle 20 and pylon assembly 21 which overlap wing 11.

In comparison, the solid line representing the changing Cp values as measured over the surface of modified wing 11 including glove 12 shows a more gently sloped line extending from a supercritical value toward the zero Cp line, but remaining negative over the entire wing surface. The entirely negative values of the solid line indicate that the entire wing surface is functioning as a lifting body. The solid line in FIG. 13 does not include the undesirable inflections indicated by points A and B on the dotted line, with the corresponding benefits becoming clear from the following discussion. In effect a part of the upper wing surface and the glove assembly jointly form a portion of concave configuration streamwise at a location substantially opposite the leading portion of the engine nacelle, with a further portion of increased convexity being positioned streamwise forward of the concave portion as compared to an unmodified aircraft. It is this structure which maintains a negative coefficient of pressure over the entire inboard portion of the wing.

Referring again to FIG. 1, a pair of similarly shaped nacelles 20 are each attached to an aft portion of fuselage 14 via similarly shaped connecting pylons 21. Because each nacelle and pylon structure is similar, a discussion of only one assembly is considered sufficient for a complete understanding of the present invention. Nacelle 20 overlaps a trailing edge portion of modified wing 11 and may include a thrust reverser 22 attached to a rear portion, as shown in FIG. 5A. Alternatively, thrust reverser 22 may be eliminated as shown in FIG. 5B, with slight changes being made to the shape of pylon assembly 21.

Modified pylon assembly 21 completely encloses a standard pylon assembly 23 used to attach nacelle 20 to fuselage 14 in an unmodified Gates Learjet type aircraft. Pylon assembly 21 includes an upper surface 24 and a spaced, lower surface 25, with surfaces 24 and 25 approaching and finally contacting one another at common leading and trailing edges and indicated in FIGS. 2A and 2B, respectively.

Upper and lower pylon surfaces 24 and 25, respectively, have each been aerodynamically shaped to provide a smooth air flow surface about modified pylon assembly 21. The description of and the purpose for the particular shapes of pylon surfaces 24 and 25 will follow hereafter. The location of pylon surfaces 24 and 25 in a preferred embodiment of the present invention has been tabulated with respect to the distance between surfaces 24, 25 and water line WL and butt line BL, respectively, as conventionally determined for selected fuselage stations. Furthermore, the data has been tabulated for a pylon assembly 21 adaptable for use with a nacelle 20 not including a thrust reverser 22.

TABLE 4
(without Thrust Reversers
WL = Water Line, BL = Butt Line)

| Fuselage Station | W.L. | B.L. | W.L. | B.L. | W.L. | B.L. |
|---|---|---|---|---|---|---|
| | A | | B | | C | |
| 267.82 | 41.75 | 23.53 | 41.75 | 23.53 | | |
| 268.00 | 42.11 | 23.395 | 41.405 | 23.63 | | |
| 269.00 | 42.51 | 23.19 | 40.89 | 23.785 | | |
| 270.00 | 42.66 | 23.075 | 40.545 | 23.855 | 42.66 | 29.255 |
| 271.00 | 42.76 | 22.97 | 40.23 | 23.905 | 42.745 | 29.165 |
| 272.00 | 42.86 | 22.885 | 39.92 | 23.95 | 42.81 | 29.08 |
| 273.00 | 42.95 | 22.80 | 39.63 | 23.99 | 42.865 | 29.00 |
| 274.00 | 43.04 | 22.715 | 39.35 | 24.025 | 42.915 | 28.92 |
| 275.00 | 43.115 | 22.64 | 39.08 | 24.05 | 42.965 | 28.845 |
| 280.00 | 43.445 | 22.325 | 37.855 | 24.07 | 43.145 | 28.57 |
| 285.00 | 43.685 | 22.065 | 36.735 | 23.995 | 43.265 | 28.405 |
| 290.00 | 43.86 | 21.83 | 35.72 | 23.92 | 43.31 | 28.30 |
| 295.00 | 43.995 | 21.61 | 34.81 | 23.855 | 43.285 | 28.27 |
| 300.00 | 44.115 | 21.42 | 33.985 | 23.745 | 43.225 | 28.29 |
| 305.00 | 44.25 | 21.26 | 33.22 | 23.605 | 43.125 | 28.36 |
| 310.00 | 44.355 | 21.125 | 32.525 | 23.43 | 42.965 | 28.465 |
| 315.00 | 44.455 | 20.99 | 31.89 | 23.235 | 42.735 | 28.63 |
| 320.00 | 44.54 | 20.84 | 31.325 | 22.975 | 42.41 | 28.965 |
| 325.00 | 44.61 | 20.675 | 30.84 | 22.645 | 41.96 | 29.425 |
| 330.00 | 44.63 | 20.46 | 30.46 | 22.22 | 41.46 | 30.03 |
| 335.00 | 44.585 | 20.215 | 30.20 | 21.685 | 40.925 | 30.76 |
| 340.00 | 44.535 | 19.96 | 30.02 | 21.09 | 40.355 | 31.62 |
| 345.00 | 44.41 | 19.68 | 29.98 | 20.475 | 39.745 | 32.54 |
| 350.00 | 44.215 | 19.415 | 30.075 | 19.845 | 39.135 | 33.54 |
| 352.73 | | | | | | |
| 352.87 | | | | | | |
| 354.125 | | | | | | |
| 354.255 | | | | | | |
| 355.00 | 43.94 | 19.14 | 30.28 | 19.19 | 38.605 | 34.13 |
| 360.00 | 43.55 | 18.82 | 30.65 | 18.515 | 38.105 | 34.255 |
| 362.58 | | | | | | |
| 362.69 | | | | | | |
| 365.00 | 43.015 | 18.41 | 31.21 | 17.875 | 37.61 | 33.875 |
| 366.47 | | | | | | |
| 367.34 | | | | | 37.465 | 33.515 |

TABLE 4-continued
(without Thrust Reversers
WL = Water Line, BL = Butt Line)

| Fuselage Station | W.L. | B.L. | W.L. | B.L. | W.L. | B.L. |
|---|---|---|---|---|---|---|
| 370.00 | 42.44 | 17.925 | 31.91 | 17.24 | | |
| 375.00 | 41.98 | 17.405 | 32.725 | 16.62 | | |
| 380.00 | 41.625 | 16.86 | 33.65 | 16.005 | | |
| 385.00 | 41.285 | 16.26 | 34.63 | 15.395 | | |
| 390.00 | 41.03 | 15.605 | 35.68 | 14.79 | | |
| 395.00 | 40.85 | 14.885 | 36.83 | 14.19 | | |
| 400.00 | 40.81 | 14.095 | 38.06 | 13.60 | | |
| 405.00 | 40.94 | 13.22 | 39.40 | 12.97 | | |
| 409.28 | | | | | | |
| 410.08 | 41.125 | 12.32 | 41.125 | 12.32 | | |
| | D | | E | | F | |
| 267.82 | | | 41.75 | 31.94 | 41.75 | 31.94 |
| 268.00 | | | 42.11 | 31.975 | 41.11 | 31.89 |
| 269.00 | | | 42.51 | 31.875 | 40.89 | 31.78 |
| 270.00 | | | 42.66 | 31.775 | 40.545 | 31.68 |
| 271.00 | 40.23 | 29.08 | 42.745 | 31.68 | 40.23 | 31.58 |
| 272.00 | 39.93 | 28.985 | 42.81 | 31.595 | 39.93 | 31.49 |
| 273.00 | 39.645 | 28.905 | 42.865 | 31.51 | 39.645 | 31.41 |
| 274.00 | 39.385 | 28.825 | 42.915 | 31.43 | 39.385 | 31.33 |
| 275.00 | 39.14 | 28.75 | 42.965 | 31.355 | 39.14 | 31.255 |
| 280.00 | 38.155 | 28.475 | 43.145 | 31.075 | 38.155 | 30.975 |
| 285.00 | 37.42 | 28.305 | 43.265 | 30.91 | 37.42 | 30.81 |
| 290.00 | 36.95 | 28.21 | 43.31 | 30.81 | 36.95 | 30.71 |
| 295.00 | 36.53 | 28.18 | 43.285 | 30.78 | 36.53 | 30.685 |
| 300.00 | 36.185 | 28.185 | 43.255 | 30.79 | 36.185 | 30.69 |
| 305.00 | 35.89 | 28.26 | 43.125 | 30.86 | 35.89 | 30.77 |
| 310.00 | 35.65 | 28.41 | 42.965 | 30.97 | 35.65 | 30.915 |
| 315.00 | 35.48 | 28.63 | 42.735 | 31.14 | 35.48 | 31.135 |
| 320.00 | 35.35 | 29.03 | 42.41 | 31.48 | 35.35 | 31.545 |
| 325.00 | 35.265 | 29.595 | 41.96 | 31.94 | 35.265 | 32.15 |
| 330.00 | 35.26 | 30.335 | 41.46 | 32.56 | 35.26 | 32.88 |
| 335.00 | 35.31 | 31.24 | 40.925 | 33.30 | 35.31 | 33.79 |
| 340.00 | 35.42 | 32.28 | 40.355 | 34.16 | 35.42 | 34.84 |
| 345.00 | 35.675 | 33.42 | 39.745 | 35.09 | 35.675 | 35.98 |
| 350.00 | 36.00 | 34.395 | 39.135 | 36.135 | 36.00 | 37.22 |
| 352.73 | | | | | | |
| 352.87 | | | 38.81 | 36.79 | | |
| 354.125 | | | | | 36.19 | 37.905 |
| 354.255 | | | 38.67 | 36.81 | | |
| 355.00 | 36.215 | 34.725 | | | | |
| 360.00 | 36.395 | 34.555 | | | | |
| 362.58 | | | | | | |
| 362.69 | | | | | | |
| 365.00 | 36.78 | 33.945 | | | | |
| 366.47 | | | | | | |
| 367.34 | 36.985 | 33.515 | | | | |
| | G | | H | | J | |
| 354.125 | | | 36.44 | 37.49 | | |
| 354.255 | 38.425 | 36.64 | | | | |
| 355.00 | | | | | | |
| 360.00 | | | | | | |
| 362.58 | 37.60 | 35.44 | | | | |
| 362.69 | | | 36.815 | 35.82 | | |
| 365.00 | | | | | | |
| 366.47 | | | | | 37.21 | 33.86 |
| 367.34 | | | | | | |
| 370.00 | | | | | 37.30 | 32.094 |
| 375.00 | | | | | 37.515 | 29.59 |
| 380.00 | | | | | 37.80 | 27.09 |
| 385.00 | | | | | 38.12 | 24.588 |
| 390.00 | | | | | 38.51 | 22.085 |
| 395.00 | | | | | 38.97 | 19.58 |
| 400.00 | | | | | 39.55 | 17.08 |
| 405.00 | | | | | 40.26 | 14.58 |
| 409.28 | | | | | 40.985 | 12.457 |

Figure 2A:
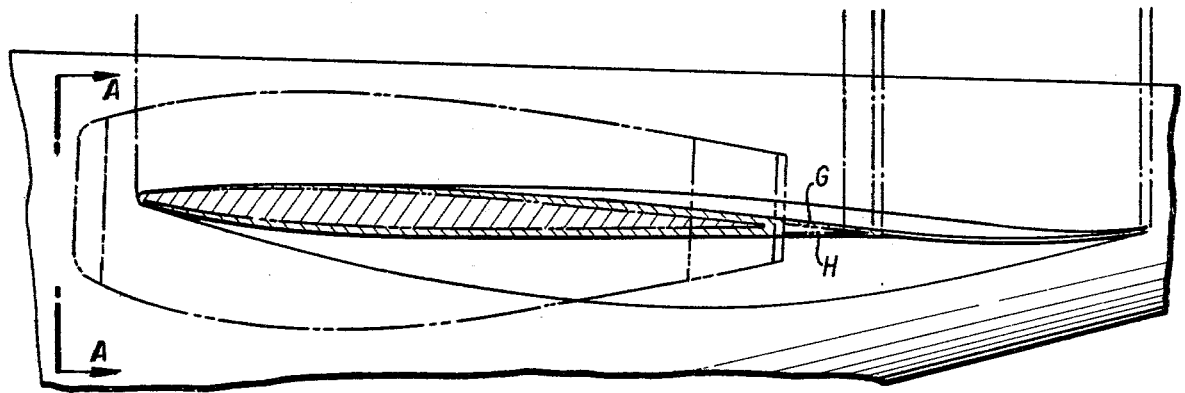
Figure 3:
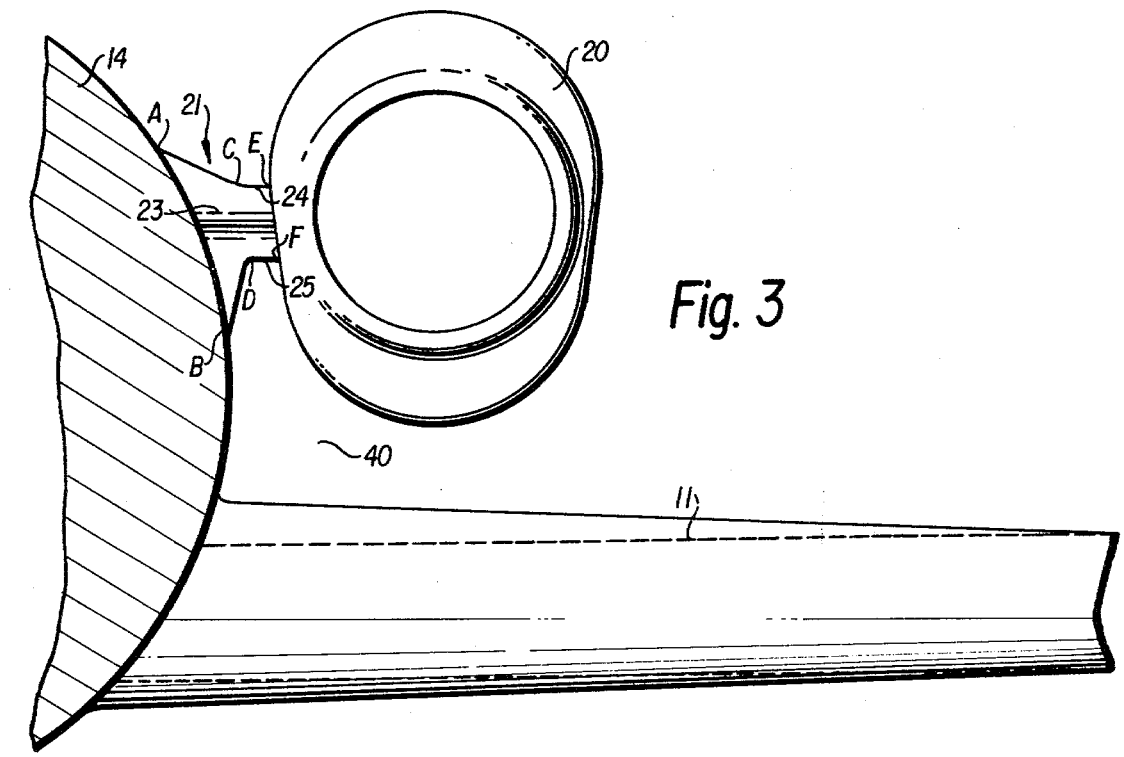
FIG. 3 is a view taken generally along the line A—A of FIG. 2A, showing a cross-sectional view of the channel formed by the nacelle, pylon, fuselage and wing, respectively.

Referring to Table 4, the fuselage stations are measured in inches along a center line extending from the front to the rear of either a Model 23 or Model 24 unmodified Learjet type aircraft. It is noted that the particular numerical values for other aircraft, such as Learjet Model 25, will differ, but the relationship between the contours of the various surfaces will remain substantially the same as described hereafter. The letters A–J each refer to specific contour lines extending along either pylon surfaces 24 or 25 as shown in FIGS. 2A, 2B and 3, respectively. Specifically, letter A refers to a contoured edge of upper pylon surface 24 in contact with fuselage 14. Letter B refers to a contoured edge of lower pylon surface 25 also in contact with fuselage 14. Letter C refers to a contoured line along upper pylon surface 24 which marks the lowermost edge of a faired portion of pylon surface 24 sloping generally downwardly from edge A to line C, as best shown in FIG. 3. Letter D refers to a line along lower pylon surface 25 sloping generally upwardly from edge B to line D.

It is noted in FIG. 3 and Table 4 that the faired surface portions A–C and B–D of pylon surfaces 24 and 25, respectively, generally slope toward one another to decrease the overall width of pylon assembly 21 extending from fuselage 14 to lines C and D over an intermediate portion of pylon 21. Referring again to Table 3, letter E refers to a contoured edge of upper pylon surface 24 in contact with nacelle 20 and letter F refers to a contoured edge of lower pylon 25 also in contact with nacelle 20. Letter G refers to a center line forming an outboard edge of upper pylon surface 24 extending rearwardly of nacelle 20 which is aligned with and vertically above a center line indicated by letter H, also extending rearwardly of nacelle 20 along lower pylon surface 25. Finally, letter J refers to a rear edge surface of pylon assembly 21 extending substantially from the outboard junction of surfaces 25 and 24 to fuselage 14. It is to be noted that center lines G, H and J are each formed with a radius of curvature of substantially 0.250 inches.

A forward portion of pylon assembly 21 in a preferred embodiment relating to Learjet Models 23 and 24, respectively, substantially begins at fuselage station 267.82, which is substantially the starting point for unmodified pylon assembly 23. While the unmodified pylon assembly 23 terminates substantially near fuselage station 352.70, modified pylon 21 may extend substantially to fuselage station 410.08. Upper surface line C and lower surface line D do not begin until fuselage stations 270.00 and 271.00, respectively, wherein the extreme forward portions of upper and lower pylon surfaces 24 and 25 each forms a substantially continuous horizontal surface between edges A–E and B–F, respectively. As noted at fuselage station 275.00, line C is 0.150 inches lower than a similar position along edge A, indicating a slight downwardly extending slope therebetween. Furthermore, a similar position on line D is 0.06 inches higher than a position on edge B, indicating a slight upwardly extending slope therebetween, as shown in FIG. 3. It is further noted at fuselage station 275.00 that a point on upper edge E is at substantially the same height as a point of line C (42.965), indicating a substantially horizontally extending surface therebetween. Similarly, a point on edge F is at substantially the same height as a point on line D (39.14), also indicating a substantially horizontally extending surface therebetween.

As tabulated in Table 4, each of the lines A–F forms a smoothly curved, aerodynamically contoured surface, with the intermediate portions of upper pylon surface 24 and lower pylon surface 25 being smoothly faired between surfaces A–F, respectively. Edge surface A forms a generally concave shape as viewed from a water line of fuselage 14. An end portion of edge surface A, between fuselage stations 385.00 and 410.08, reverses direction and forms a convexly shaped trailing surface sloping generally upwardly from a water line of the fuselage. Line surface C is also generally concave in shape as viewed from a water line of the fuselage. It is noted that the highest position of line C occurs at approximately fuselage station 290.00, while the highest position of edge surface A occurs at approximately fuselage station 330.00. This means the curved shape of edge A trails the similarly curved shape of line C as measured along fuselage 14, with the intermediate upper pylon surface between A and C being smoothly faired to provide a continuous, aerodynamic contour.

Edge E of upper pylon surface 24 is formed with a concave shape substantially paralleling that of line C, indicating a substantially horizontally extending faired surface therebetween. Edge B forms a generally convexly shaped surface as viewed from the fuselage water line, with the lowest point on edge B occurring at approximately fuselage station 340.00, whereby the curved surface of edge B trails the similarly curved surface of line D with a smoothly faired surface extending therebetween.

Trailing edge J defines a curved connecting surface extending between upper pylon surface 24 and lower pylon surface 25, which extends rearwardly substantially between fuselage stations 366.47 and 409.28, respectively. Edge J rises slightly as it forms a continuous trailing edge substantially from a butt line position 33.86 adjacent nacelle 20 to a butt line position 12.437 adjacent a surface portion of fuselage 14.

Finally, a pair of generally corresponding lines G and H form the outer edges of upper pylon surface 24 and lower pylon surface 25, respectively. Contour edges G and H slope generally toward one another while extending rearwardly from approximately fuselage station 354.225 to fuselage station 362.69. It is noted that edge G is slightly lower than edge C, while line H is slightly higher than line D, allowing outboard portions of upper pylon surface 24 and lower pylon surface 25 to gradually slope toward one another over the trailing portion of pylon 21. The outer edge of upper pylon surface 24 is smoothly faired into line G to form a continuously curved surface portion extending through lines C and G, respectively.

The shape of the forward pylon surfaces 24 and 25 of pylon assembly 21 used with a thrust reverser 5A are substantially similar to the shape of forward pylon surfaces described hereabove for use without thrust reverser 22. The attachment of thrust reverser 22 to nacelle 20 requires modifications to the rearward portions of pylon surfaces 24 and 25. Specifically, the trailing outboard edge of pylon 21 is spaced from the gradually approaches thrust reverser 22, while moving toward the forward end of pylon 21 and contacts nacelle 20 at substantially the point of juncture of thrust reverser 22. The outboard portion of pylon 21 further includes an enlarged edge portion 26 which meets with trailing edge J. Edge portion 26 surrounds the thrust reverser control mechanism and includes a blunted outboard edge extending substantially in a vertical direction. Enlarged portion 26 smoothly fairs into pylon 21 and provides a smooth air flow path thereover.

Turning to FIGS. 4A and 4B, a nacelle 20 modified in accordance with the present invention is shown in cross-sectional and profile views, respectively. A center line extending through nacelle 20 is indicated by the horizontally extending line I—I in FIG. 4A, while a line of symmetry is indicated in FIG. 4B by the vertical line II—II. The location of a point on the surface of nacelle 20 is determined by the distances Z and Y as measured from the lines I—I and II—II, respectively.

Referring to the following Table 5, the modified shape of nacelle 20 is defined by Y and Z coordinates as determined for selected nacelle stations spaced along a chord line extending longitudinally through nacelle 20. While the following values apply to the Models 23 and 24 Learjet in particular, similarly contoured nacelles having proportionately different values are equally adaptable for use with other aircraft, such as the Learjet Model 25, for example.

TABLE 5

NACELLE
(Selected stations taken lengthwise through nacelle, fore to aft)

| Sta. 4.00 | | Sta. 6.56 | | Sta. 9.84 | | Sta. 11.40 | |
|---|---|---|---|---|---|---|---|
| Z | Y | Z | Y | Z | Y | Z | Y |
| Nacelle Cl | 10.19 | Nacelle Cl | 10.80 | Nacelle Cl | 11.31 | Nacelle Cl | 11.54 |
| −1.00 | 10.30 | −1.00 | 10.91 | −1.00 | 11.44 | −1.00 | 11.65 |
| −2.00 | 10.36 | −2.00 | 10.97 | −2.00 | 11.51 | −2.00 | 11.72 |
| −3.00 | 10.36 | −3.00 | 10.99 | −3.00 | 11.53 | −3.00 | 11.76 |
| −4.00 | 10.32 | −4.00 | 10.95 | −4.00 | 11.52 | −4.00 | 11.75 |
| −5.00 | 10.21 | −5.00 | 10.87 | −5.00 | 11.46 | −5.00 | 11.69 |
| −6.00 | 10.04 | −6.00 | 10.73 | −6.00 | 11.34 | −6.00 | 11.57 |
| −7.00 | 9.79 | −7.00 | 10.52 | −7.00 | 11.16 | −7.00 | 11.39 |
| −8.00 | 9.43 | −8.00 | 10.24 | −8.00 | 10.91 | −8.00 | 11.15 |
| −9.00 | 8.97 | −9.00 | 9.86 | −9.00 | 10.57 | −9.00 | 10.81 |
| −10.00 | 8.35 | −10.00 | 9.35 | −10.00 | 10.12 | −10.00 | 10.38 |
| −11.00 | 7.53 | −11.00 | 8.68 | −11.00 | 9.53 | −11.00 | 9.82 |
| −12.00 | 6.43 | −12.00 | 7.75 | −12.00 | 8.75 | −12.00 | 9.08 |
| −13.00 | 4.71 | −13.00 | 6.44 | −13.00 | 7.67 | −13.00 | 8.08 |
| −13.50 | 3.25 | −13.50 | 5.51 | −14.00 | 6.00 | −14.00 | 6.61 |
| −13.75 | 1.95 | −14.00 | 4.21 | −14.50 | 4.72 | −14.50 | 5.50 |
| −13.90 | — | −14.30 | 3.00 | −15.00 | 2.60 | −15.00 | 3.86 |
| | | −14.59 | — | −15.22 | — | −15.30 | 2.25 |
| | | | | | | −15.46 | — |

| Sta. 13.78 | | Sta. 16.61 | | Sta. 19.45 | | Sta. 22.64 | |
|---|---|---|---|---|---|---|---|
| Z | Y | Z | Y | Z | Y | Z | Y |
| Nacelle Cl | 11.82 | Nacelle Cl | 12.11 | Nacelle Cl | 12.34 | Nacelle Cl | 12.51 |
| −1.00 | 11.93 | −1.00 | 12.21 | −1.00 | 12.43 | −1.00 | 12.60 |
| −2.00 | 12.00 | −2.00 | 12.27 | −2.00 | 12.49 | −2.00 | 12.66 |
| −3.00 | 12.04 | −3.00 | 12.30 | −3.00 | 12.52 | −3.00 | 12.69 |
| −4.00 | 12.03 | −4.00 | 12.30 | −4.00 | 12.51 | −4.00 | 12.68 |
| −5.00 | 11.98 | −5.00 | 12.26 | −5.00 | 12.47 | −5.00 | 12.65 |
| −6.00 | 11.88 | −6.00 | 12.18 | −6.00 | 12.38 | −6.00 | 12.57 |
| −7.00 | 11.71 | −7.00 | 12.02 | −7.00 | 12.24 | −7.00 | 12.45 |
| −8.00 | 11.47 | −8.00 | 11.79 | −8.00 | 12.03 | −8.00 | 12.26 |
| −9.00 | 11.15 | −9.00 | 11.14 | −9.00 | 11.73 | −9.00 | 11.99 |
| −10.00 | 10.73 | −10.00 | 11.06 | −10.00 | 11.35 | −10.00 | 11.64 |
| −11.00 | 10.19 | −11.00 | 10.54 | −11.00 | 10.86 | −11.00 | 11.19 |
| −12.00 | 9.50 | −12.00 | 9.88 | −12.00 | 10.23 | −12.00 | 10.60 |
| −13.00 | 8.57 | −13.00 | 9.04 | −13.00 | 9.43 | −13.00 | 9.85 |
| −14.00 | 7.24 | −14.00 | 7.86 | −14.00 | 8.35 | −14.00 | 8.85 |
| −14.50 | 6.34 | −15.00 | 6.04 | −15.00 | 6.73 | −15.00 | 7.40 |
| −15.00 | 5.10 | −15.50 | 4.64 | −15.50 | 5.58 | −15.50 | 6.38 |
| −15.50 | 3.18 | −16.00 | 2.04 | −16.00 | 3.78 | −16.00 | 4.90 |
| −15.79 | — | −16.13 | — | −16.37 | — | −16.30 | 3.50 |
| −15.79 | — | −16.13 | — | −16.37 | — | −16.30 | 3.50 |
| | | | | | | −16.57 | — |

| Sta. 26.25 | | Sta. 30.51 | | Sta. 34.54 | |
|---|---|---|---|---|---|
| Z | Y | Z | Y | Z | Y |
| Nacelle Cl | 12.69 | Nacelle Cl | 12.83 | Nacelle Cl | 12.93 |
| −1.00 | 12.77 | −1.00 | 12.91 | −1.00 | 13.01 |
| −2.00 | 12.83 | −2.00 | 12.97 | −2.00 | 13.06 |
| −3.00 | 12.87 | −3.00 | 13.00 | −3.00 | 13.08 |
| −4.00 | 12.87 | −4.00 | 13.00 | −4.00 | 13.07 |
| −5.00 | 12.83 | −5.00 | 12.97 | −5.00 | 13.04 |
| −6.00 | 12.75 | −6.00 | 12.91 | −6.00 | 13.00 |
| −7.00 | 12.63 | −7.00 | 12.82 | −7.00 | 12.92 |
| | | | −7.00 | | |
| −8.00 | 12.47 | −8.00 | 12.68 | −8.00 | 12.80 |
| −9.00 | 12.24 | −9.00 | 12.48 | −9.00 | 12.64 |
| −10.00 | 11.93 | −10.00 | 12.21 | −10.00 | 12.40 |

TABLE 5-continued

NACELLE
(Selected stations taken lengthwise through nacelle, fore to aft)

| −11.00 | 11.52 | −11.00 | 11.85 | −11.00 | 12.08 |
|---|---|---|---|---|---|
| −12.00 | 10.98 | −12.00 | 11.36 | −12.00 | 11.64 |
| −13.00 | 10.28 | −13.00 | 10.73 | −13.00 | 11.05 |
| −14.00 | 9.36 | −14.00 | 9.87 | −14.00 | 10.25 |
| −15.00 | 8.04 | −15.00 | 8.67 | −15.00 | 9.16 |
| −16.00 | 5.84 | −16.00 | 6.78 | −16.00 | 7.33 |
| −16.50 | 3.76 | −16.50 | 5.14 | −16.50 | 5.79 |
| −16.79 | — | −16.91 | — | −17.00 | — |

It is to be noted in FIG. 4A that only a selected area beneath center line I—I has been modified with respect to an unmodified nacelle mounted on a Learjet type aircraft. Specifically, an outer cheek portion 30 of nacelle 20 has been reduced in diameter on both sides of the axis of symmetry II—II. The shaded areas 31 in FIG. 4A indicates the amount of material which has been removed from a conventional Learjet nacelle to form the modified nacelle 20 according to the present invention. The affected cheek portion 30 extends substantially between nacelle station 4.00 and 34.45, respectively, with the selected stations in Table 4 measured in inches along a center line.

Figure 12:
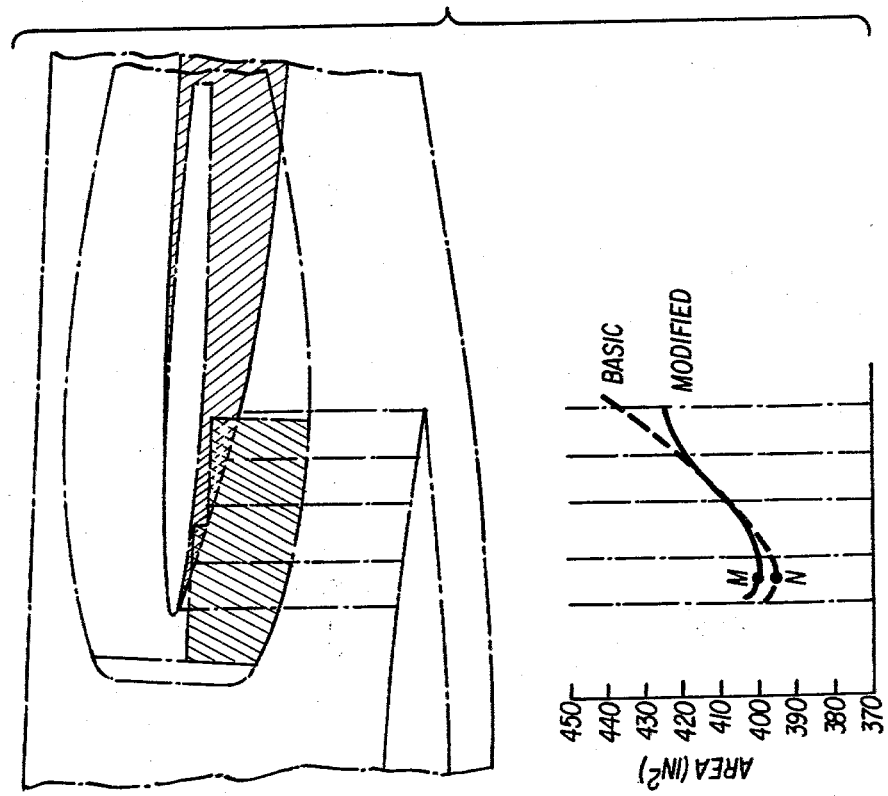
FIG. 12 is a graphical representation of the changing area as measured lengthwise through the channel of a Learjet type aircraft before and after modifications to the nacelle, lower pylon and wing surfaces.

For a clearer appreciation of the change in nacelle 20, reference is had to FIGS. 14 A–D which show cross-sectional views of the channel taken at selected stations corresponding to the planes I, II, III and IV in FIG. 12. In particular, FIG. 14A indicates the nacelle shape at substantially 19.5 inches ahead of the trailing edge of wing 11, while FIG. 14B depicts the nacelle at substantially 12 inches, FIG. 14C at substantially 6 inches and FIG. 14D at the trailing edge of wing 11.

The unmodified nacelle cheek is shown by dotted line 32, while the modified nacelle cheek is shown by the solid line 30. Finally, the shaped area 31 between lines 30 and 32 represents the area removed to form the modified nacelle. By examining FIGS. 14A–D, it is noted that the area 31 decreases in a rearward direction along nacelle 20, with lines 30 and 32 substantially merging at the trailing edge of wing 11.

Referring now to FIG. 12, the graph indicates the frontal area determined at longitudinal stations through a channel formed by the wing 11, fuselage 14, pylon assembly, inboard portion of nacelle 20 between axis of symmetry and center line, as well as a plane 8, as best shown in FIGS. 14A–D, continuing from the axis of symmetry into perpendicular contact with wing 11. The dotted line is indicative of the changing area determined through a channel formed in an unmodified Learjet type aircraft, including a pylon assembly 23. It is noted that the dotted line includes a curved portion and further includes a portion sloping in a generally upwardly direction. This indicates that the area within the channel is increasing in the longitudinal downstream direction to form a convergent-divergent channel with the curved portion representing a point of minimum area or channel throat.

In the Gates Learjet type aircraft, it has been determined that the ratio of the channel exit area to the throat area produces an area ratio which is greater than or equal to 1:1.1. In comparison, the same ratio as determined for the modified channel is less than or equal to 1:1.065. The reduced ratio is indicative of reduced channel divergence and functions to prevent the formation of shock waves in the convergent-divergent channel. A channel having an area ratio greater than 1.065 will cause a substantial supersonic air flow therethrough, thus creating a shock wave which adversely affects the performance of the aircraft by substantially increasing the drag.

Referring again to FIG. 12, the solid line represents the changing are through a channel 40 defined by a trailing edge portion of wing assembly 11, fuselage 14, modified lower pylon surface 24 and the modified inboard cheek 30 of nacelle 20. The solid line in the graph of FIG. 12 includes a curved portion and a further portion sloping in an upwardly direction indicative of a convergent-divergent channel. But, the narrowest portion or throat of the channel 40 is indicated at M on the solid line and corresponds to an area of approximately 400 square inches, while the narrowest portion N of a channel formed in an unmodified Learjet type aircraft has a value of 395 square inches. This means that modified channel 40 has a wider throat area to allow more air therethrough, which helps to prevent the air flowing therethrough from reaching M=1. In a similar manner, the trailing end of the unmodified channel has a larger area of approximately 435 square inches, while the trailing end of the modified channel has a smaller area of approximately 425 square inches. Thus, the unmodified channel diverges by substantially 40 square inches as compared to a divergence of only 25 square inches in the channel as modified according to a preferred embodiment of the invention. This difference clearly shows the decreased channel divergence resulting from the specific modifications to the wings, pylon surfaces and nacelle cheek of the unmodified Learjet type aircraft.

The effect of these changes can be best understood with reference to FIG. 10, which shows a plot of the changing pressure coefficient as measured through the unmodified channel and the modified channel. Air flowing through the unmodified channel produced values indicated by the dotted line which is shown to go well above the super critical Cp value within the channel. The pressure coefficient reaches a peak level as indicated at point O in the graph of FIG. 10, indicating that essentially supersonic air flow exists within the unmodified channel producing an undesirable shock wave therein. In comparison, the solid line indicates changing pressure coefficient Cp within the modified channel, wherein the position of highest negative value P only slightly exceeds the super critical Cp value. As a result of the less negative Cp values developed in the modified channel, air flow remains essentially subsonic throughout the channel, preventing the formation of a shock wave and significantly reducing undesirable drag. While localized supersonic flow may exist in the modified channel as indicated by point P in graph 10, it is important to note that the reduced divergence of the modified channel will prevent shock waves from forming therein. In comparison, the steeply sloped dotted line segment immediately downstream of point O is indicative of the presence of a shock wave within the converging-diverging channel.

The change in air flow around modified pylon 21 relative to the air flow around original pylon 23 is evident from a comparison of the graphs shown in FIGS. 9 and 10 respectively. Air flow through the unmodified channel partially defined by pylon means 23 produces a pressure coefficient shown by the dotted line in FIG. 10, which goes from a highly negative, super critical value at point O to a slightly positive value at point R. The air flow then picks up speed as evidenced by reversal of the dotted line which again goes negative at the point S. In comparison, air flow through the modified channel 40 produces changing pressure coefficients indicated by the solid line in FIG. 10 which forms a smooth curve that has a maximum negative value at point P and then becomes increasingly less negative, finally going positive at point T. Once the Cp values in the modified channel go positive, the solid line indicates that the Cp values remain positive as the air flows along the trailing portion of the lower pylon surface 25.

As shown in FIG. 9, the flow over the upper pylon surface remains negative for the upper surface of original pylon 23 as well as the modified upper pylon surface 24. It is important to note that the negative Cp values indicated by the solid line in FIG. 9 gradually approach but do not reach O, as the flowing air approaches the rearward end of upper pylon surface 24. The positive Cp values along the lower pylon surface 25 act to balance the slightly smaller negative Cp of the flow over upper pylon surface 24, producing a positive net Cp value which remains between 0 and +0.1Cp over approximately the trailing 30% of pylon assembly 21. This allows the air to recompress after passing over pylon 21 with very little residual turbulence. The result is a much greater residual thrust component as well as a significant reduction in drag.

In comparison, the negative value of the dotted line to the left of point S in FIG. 10 combines with the negative value of the dotted line in FIG. 9, producing an unbalanced upwardly directed force on the rear portion of pylon assembly 23 which leaves the air in a highly disturbed state. As a result, a high level of undesirable drag is formed which adversely affects the force generated by the T-tail assembly of a Learjet type aircraft.

Figure 7:
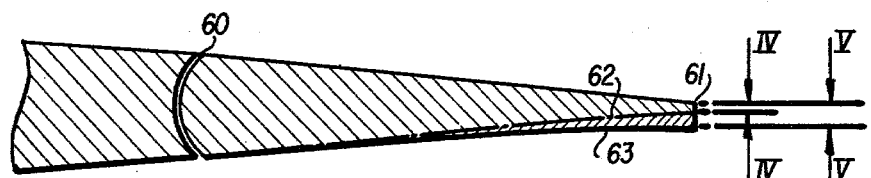
FIG. 7 is a partial cross-sectional view of a modified trailing edge wing portion taken substantially along the line E—E of FIG. 1 and including a thickened trailing edge portion.
Figure 8:
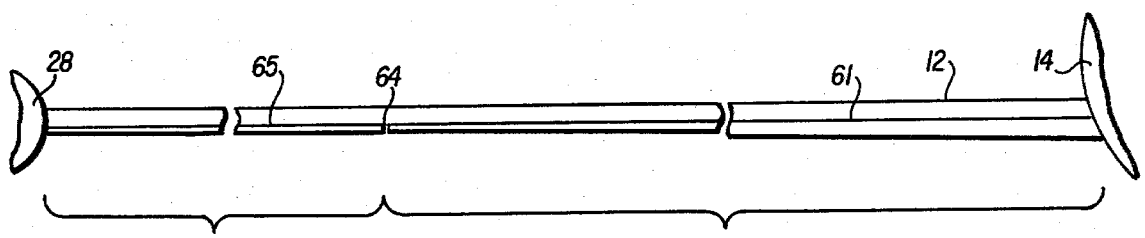
FIG. 8 is a longitudinal view of a trailing edge wing portion taken substantially along a line F—F of FIG. 1, showing a thickened trailing edge tapering along a portion of the wing assembly.

As shown in FIGS. 7 and 8, the rearward portion of wing 11 between fuselage 14 and tip tank 28 has been modified in the following manner. Specifically, a point 60 represents a position on the trailing portion of NACA 64A-109 airfoil as derived for use with a Gates Learjet type aircraft. In a preferred embodiment, point 60 may represent chord station .90. Similarly, numeral 61 indicates a chord station 1.00 or trailing edge of the wing assembly 11, with a line 62 representing the unmodified shape of airfoil NACA 64A-109 extending therebetween. The thickness of the trailing edge of the unmodified wing is shown as the distance between the arrows IV-IV in FIG. 7 and can be found in the table shown in Columns 5 and 6 of the previously incorporated U.S. Pat. No. 4,050,651.

In comparison, the wing as modified in accordance with the present invention includes a thickened trailing edge as indicated by line 63 extending between points 60 and 61 on the aft portion of the airfoil. The thickened trailing edge portion of wing 11 tapers from fuselage 14 to an intermediate point 64, which may be positioned at the beginning of the wing aileron assembly, with the actual thickness being chosen between 0.001C and 0.010C, respectively. From the point 64, the thickened trailing edge can be made to taper smoothly until meeting tip tank 28 or the trailing edge can be made with a substantially constant thickness over aileron assembly 65 to provide ease of manufacture. In the preferred embodiment, the trailing edge of the aileron assembly is essentially a constant value of substantially 0.005C. The purpose of the thickened trailing edge is to reduce the boundary layer thickness generated by air flowing over the wing. Because the thickness of the boundary layer and the amount of drag created thereby are directly proportional, reduced boundary layer thickness will provide a corresponding reduction in drag.

The changing cross-sectional shape of wing assembly 11 is best shown in FIGS. 6A-6D, respectively, wherein FIG. 6A shows glove assembly 12 substantially surrounding wing 11 at wing station 35.433. As described previously, glove 12 tapers into existing wing 11, with FIG. 6C showing the shape of wing 11 at substantially wing station 82.00. Between wing station 82.00 and the outboard end of wing 11, shown in FIG. 6D and corresponding to wing station 181.10, a modified lower wing surface 66 extends substantially elliptically between a leading edge portion 67 of wing 11 and the unmodified lower surface of wing 11. Modified surface 66 allows the air to remain attached over a greater distance fore to aft beneath wing 11, resulting in a significant reduction in wave drag caused by turbulent air flow beneath the wing.

Figure 11:
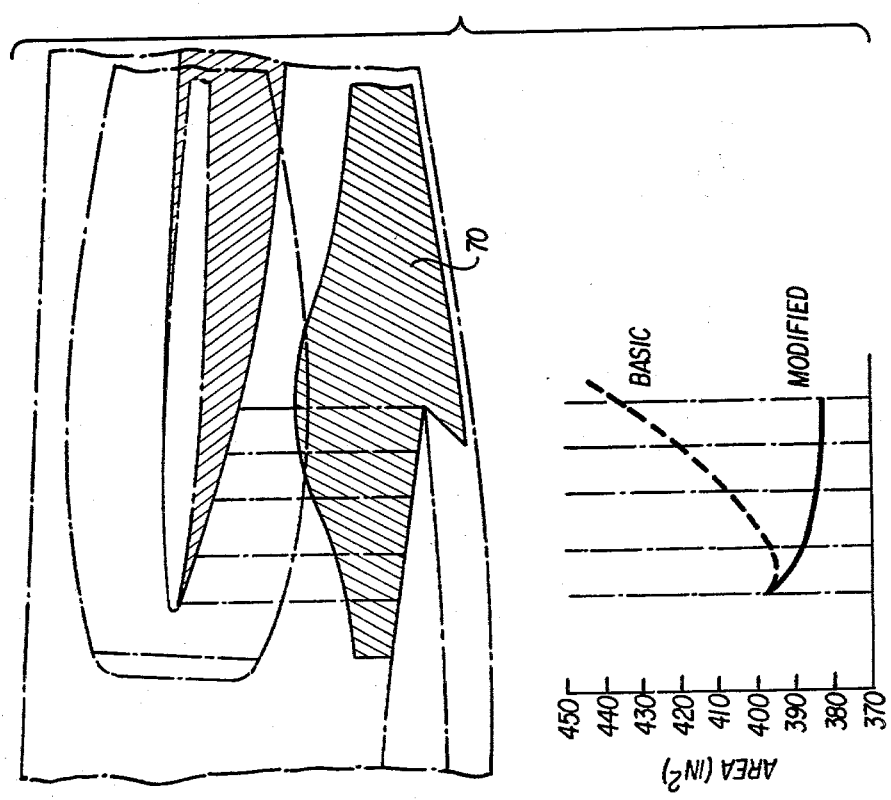
FIG. 11 is a graphical representation of the changing area as measured lengthwise through the channel of a Learjet type aircraft before and after modifications to the nacelle, lower pylon and fuselage surfaces.
Figure 14D:
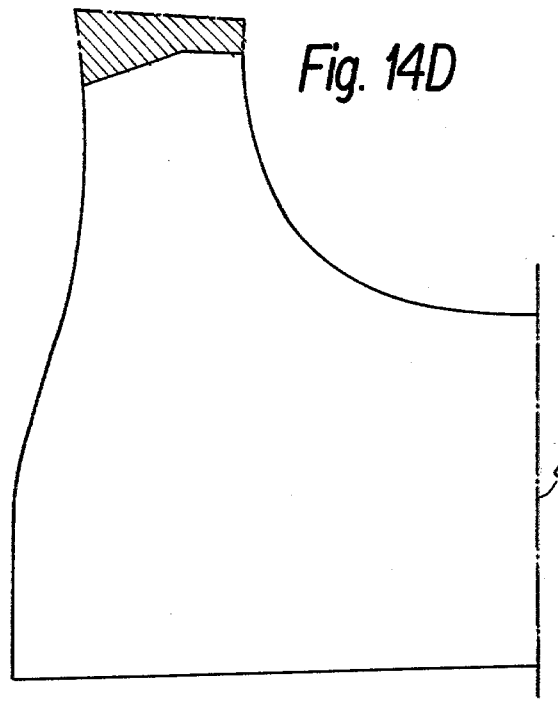
FIGS. 14A, 14B, 14C and 14D show cross-sectional views taken through the channel at stations corresponding to planes I, II, III and IV, respectively, in FIG. 12.
Figure 14C:
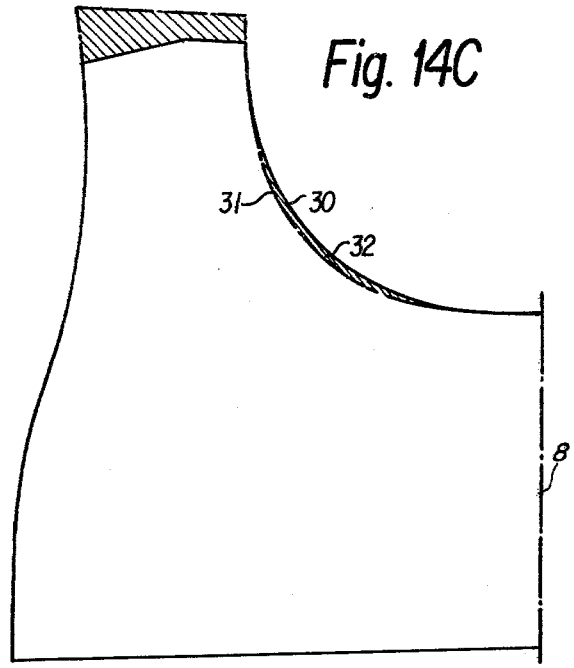
Figure 14B:
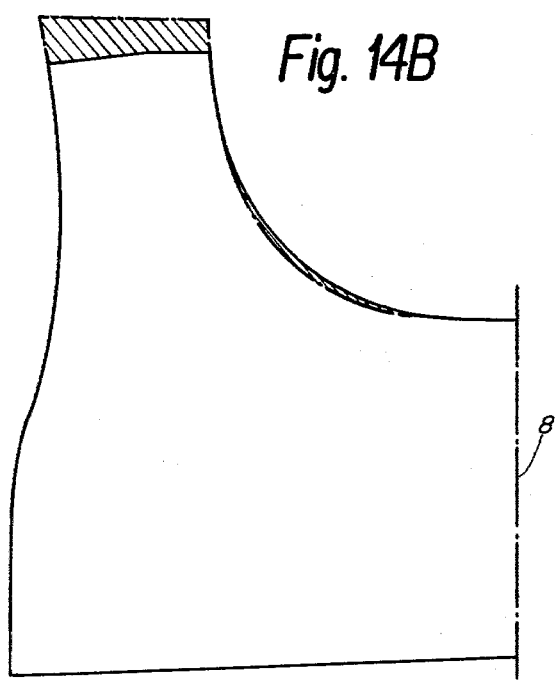
Figure 14A:
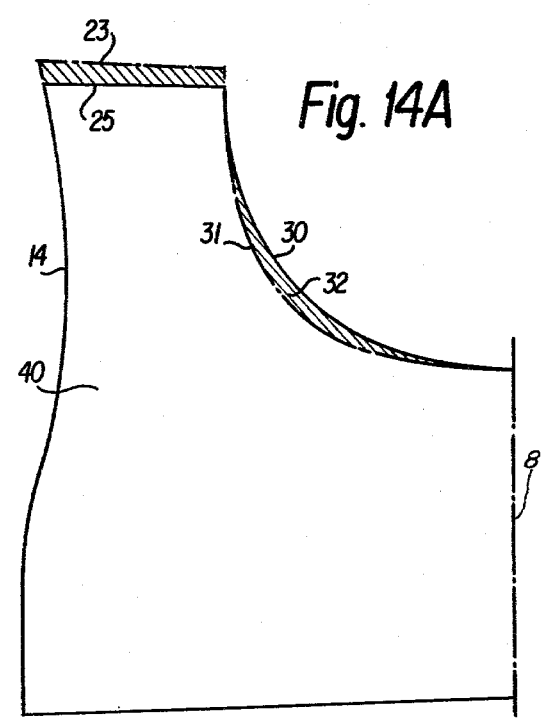

In an alternative embodiment of the present invention, the glove assembly 12 is eliminated and a body fix shown at 70 in FIG. 11 is attached directly to fuselage 14. Body fix 70 defines a portion of channel 40 and is aerodynamically shaped to maintain essentially subsonic air flow through channel 40. Body fix 70 has a generally curved shape which extends into channel 40, causing channel 40 to substantially converge throughout, as shown by the decreasing value of channel area represented by the solid line in FIG. 11. While body fix 70 functions to prevent supersonic flow through channel 40, the resulting convergent shape tends to generate a significantly higher level of drag as compared to the divergent channel 40 formed according to the preferred embodiment.

The specific numerical data included in Tables 1-5 relates to modifications for a Learjet type aircraft to provide a preferred embodiment of the present invention. Manipulating the specific dimensions of the modifications while retaining their aerodynamically unique shapes is considered within the scope of the present invention. While the present description has been limited to the preferred embodiments, these embodiments are not intended to limit the scope of the invention which is to be determined by the following claims.

What is claimed is:

1. In a jet aircraft of the type having aft fuselage-mounted engine nacelles partially overlapping trailing edge portions of the aircraft's wings, said jet aircraft being capable of flight in the transonic regime and including a channel on either side of the aircraft defined by said trailing edge portion of said wing, the aircraft fuselage, a pylon support assembly extending between said fuselage and said nacelle, a surface of said nacelle overlapping said wing, and an imaginary plane of symmetry extending from a lower-most outer surface of said nacelle into perpendicular contact with said wing, the improvement comprising:
channel means having an area ratio of cross-sectional area at the channel exit to the minimum cross-sectional area at a position within said channel, said area ratio being less than or equal to 1:1.065 for preventing the formation of shock waves in said channel during transonic flight of said aircraft.

2. An aircraft according to claim 1, wherein said channel means comprises smoothly contoured wall surfaces forming a convergent-divergent channel.

3. An aircraft according to claim 2, wherein said area ratio of said convergent-divergent channel is greater than 1:1.0 and less than or equal to 1:1.065.

4. An aircraft according to claim 2, wherein said channel includes a minimum area of substantially 400 square inches at a throat position and said channel further includes an area of substantially 425 square inches at said exit.

5. A jet aircraft according to claim 1, wherein each of said pylon support assemblies includes aerodynamically shaped and smoothly contoured upper and lower surfaces each extending between said aircraft fuselage and said engine nacelle;
said aerodynamically shaped upper and lower surfaces being inclined toward one another at locations between the leading and trailing edges of the pylon and substantially widely spaced from each other adjacent the fuselage up to a predetermined location extending outwardly from the fuselage;
said upper and lower surfaces being substantially parallel to one another from said predetermined location toward the engine nacelle.

6. A jet aircraft according to claim 5, wherein said upper and lower pylon surfaces extend in a rearwardly direction and join one another to form a rear edge which extends rearwardly toward the fuselage to form an acute angle with said fuselage.

7. A jet aircraft according to claim 6, wherein the longitudinally extending rear edge portion of said pylon assembly is smoothly flaired in a generally upward direction away from an imaginary horizontal plane making tangential contact with a vertically lowermost portion of said aircraft fuselage.

8. A jet aircraft according to claim 5, wherein said pylon assembly includes flow means for providing a coefficient of pressure Cp between 0.0 and +0.1 over the trailing edge portion of said pylon assembly during transonic flight of said aircraft.

9. A jet aircraft according to claim 8, wherein said flow means comprises said upper pylon surface having a substantially concave contour relative to an imaginary horizontal plane making tangential contact with a vertically lowermost portion of said aircraft fuselage, with said substantially concave upper pylon surface extending longitudinally beyond said engine nacelle; and
said flow means further comprises said lower pylon surface having a substantially convex contour relative to said imaginary horizontal plane making tangential contact with said fuselage, with said substantially convex lower pylon surface extending longitudinally beyond said engine nacelle and joining said upper pylon surface to form a rear edge surface.

10. An aircraft according to claim 1, including glove means surrounding a forward inboard portion of said wing for smoothly decelerating the air velocity over an inboard portion of said wing from fore to aft while maintaining a negative coefficient of pressure adjacent an inboard portion of the upper surface of said wing.

11. An aircraft according to claim 10, wherein said glove means comprises an aerodynamically shaped and smoothly contoured body including a blunt and spanwise tapered leading edge extending from said fuselage toward an outboard portion of said wing;
said glove means further including a longitudinally extending, substantially concave upper surface respective to an imaginary horizontal plane making tangential contact with a vertically lowermost portion of said wing and a longitudinally extending, substantially convex lower surface respective to said imaginary horizontal plane.

12. An aircraft according to claim 10, wherein said glove means comprises a hollow, aerodynamically contoured body adaptable for storing fuel between an outer surface of said contoured body and a portion of said wing partially surrounded by said contoured body.

13. An aircraft according to claim 1, wherein a trailing edge portion of each wing assembly has a thickness of substantially 0.005C at each wing station located between the aircraft fuselage and an outboard portion of each wing assembly.

14. A Gates Learjet aircraft of the 23, 24, 25, 28 or 29 model type having aft fuselage mounted engine nacelles partially overlapping trail edge portions of the aircraft's wings, comprising:
a channel defined by said aircraft fuselage, trailing edge portions of said wings, pylon assemblies extending between said fuselage and said nacelles, portion of the outer surface of said nacelle and an imaginary plane extending from a lowermost surface of said nacelle into perpendicular contact with said trailing wing portion;
channel means having an area ratio of cross-sectional area at the channel exit to the minimum cross-sectional area at a position within said channel, said area ratio being less than or equal to 1:1.065 for preventing the formation of shock waves in said channel during transonic flight of said jet aircraft.

15. An aircraft formed according to claim 14, wherein said channel means comprises smoothly contoured wall surfaces forming a convergent-divergent channel.

16. An aircraft formed according to claim 15, wherein said area ratio of said convergent-divergent channel is greater than 1:1.0 and less than or equal to 1:1.065.

17. An aircraft according to claim 15, wherein said channel includes a minimum area of substantially 400 square inches at a throat position and said channel further includes an area of substantially 425 square inches at said exit.

18. A jet aircraft according to claim 14, wherein each of said pylon support assemblies includes aerodynamically shaped and smoothly contoured upper and lower surfaces each extending between said aircraft fuselage and said engine nacelle;
said aerodynamically shaped upper and lower surfaces being inclined toward one another at locations between the leading and trailing edges of the pylon and substantially widely spaced from each other adjacent the fuselage up to a predetermined location extending outwardly from the fuselage;
said upper and lower surfaces being substantially parallel to one another from said predetermined location toward the engine nacelle.

19. An aircraft according to claim 14, wherein each of said nacelles includes a portion of reduced outer diameter as compared to nacelles attached to a Learjet type aircraft, with said reduced diameter portion forming a wall of said channel and extending from a forward edge of each of said nacelles to a position corresponding to a trailing edge of said respective wings, said reduced outer diameter of said nacelle increasing the flow area in said channel to prevent formation of a shock wave therein.

20. A method for modifying a jet aircraft of the type having aft fuselage-mounted engine nacelles partially overlapping trailing edge portions of the aircraft's wings, said jet aircraft being of the type which normally cruises in the transonic regime and including a channel for air formed on each side of the aircraft defined by the upper wing surface extending to its said trailing edge portion, the aircraft fuselage, a pylon support assembly extending between said fuselage and said nacelle, a surface of said nacelle overlapping said wing, and an imaginary plane of symmetry extending from a lowermost outer surface of said nacelle into perpendicular contact with said wing, the improvement which comprises:
contouring the surfaces defining said channel so as to decrease the ratio of the cross-sectional area at the exit end of said channel to the minimum cross-sectional area of the channel as compared to the ratio of at least 1.0:1.11 for said same areas in the original unmodified aircraft,
said ratio being decreased to a value such that the air passing through said channel at transonic cruising speeds of the aircraft maintains a velocity over substantially the entire length of the channel which is subsonic.

21. The method of claim 20 in which said minimum cross-sectional area of said channel is increased.

22. The method of claim 20 in which the cross-sectional area at the exit area of said channel is decreased.

23. The method of claim 20 in which both the said minimum cross-sectional area of said channel is increased and said cross-sectional area at the exit area of said channel is decreased.

24. A method for modifying a jet aircraft of the type having aft fuselage-mounted engine nacelles partially overlapping trailing edge portions of the aircraft's wings, said jet aircraft being of the type which normally cruises in the transonic regime and including a channel for air formed on each side of the aircraft defined by the upper wing surface extending to its said trailing edge portion, the aircraft fuselage, a pylon support assembly extending between said fuselage and said nacelle, a surface of said nacelle overlapping said wing, and an imaginary plane of symmetry extending from a lowermost outer surface of said nacelle into perpendicular contact with said wing, the improvement which comprises:
contouring the surfaces defining said channel so as to decrease the ratio of the cross-sectional area at the exit end of said channel to the minimum cross-sectional area of the channel as compared to the ratio of at least 1.0:1.11 for said same areas in the original unmodified aircraft,
said decrease in said ratio being accomplished by both increasing said minimum cross-sectional area and decreasing said area at the channel exit;
said ratio being decreased to a value such that the air passing through said channel at transonic cruising speeds of the aircraft maintains a velocity over substantially the entire length of the channel which is subsonic.

25. In a jet aircraft of the type having aft fuselage mounted engine nacelles partially overlapping trailing edge portions of the aircraft's wings, said jet aircraft being of the type which normally cruises in the transonic regime and including a channel for air formed on each side of the aircraft defined by the upper wing surface extending to its said trailing edge portion, the aircraft fuselage, a pylon support assembly extending between said fuselage, and said nacelle, a surface of said nacelle overlapping said wing, and an imaginary plane of symmetry extending from a lower-most outer surface of said nacelle into perpendicular contact with said wing, the improvement which comprises:

the surfaces defining said channel being contoured so as to decrease the ratio of the cross-sectional area at the exit end of said channel to the minimum cross-sectional area of the channel as compared to the ratio of at least 1.0:1.11 for said same areas in an unmodified aircraft of similar configuration, said ratio being decreased to a value such that the air passing through said channel at transonic cruising speeds of the aircraft maintains a velocity over substantially the entire length of the channel which is subsonic.

26. An aircraft according to claim 25, wherein said minimum cross-sectional area of said channel has an increased size as compared to the minimum cross-sectional area of said channel of said unmodified jet aircraft.

27. An aircraft according to claim 25, wherein the cross-sectional area at the exit area of said channel has a decreased size as compared to the cross-sectional area of said channel at the exit area of said unmodified jet aircraft.

28. An aircraft according to claim 25, wherein the minimum cross-sectional area of said channel has an increased size as compared to the minimum cross-sectional area of said channel of said unmodified aircraft, and the cross-sectional area at the exit area of said channel has a decreased size as compared to the cross-sectional area of said channel at the exit of said unmodified aircraft.

29. An aircraft according to claim 25, wherein a separate glove assembly is attached to an inboard portion of each wing assembly, each glove assembly including upper and lower smoothly contoured surfaces which join one another to form a bluntly shaped leading edge which encloses a portion of the original leading edge of one of said wings, aft portions of said upper and lower smoothly contoured surfaces merging with existing surfaces of the respective wing assembly; and means for smoothly decelerating the air flow speed over each wing assembly while retaining a negative coefficient of pressure over the entire inboard portion of each wing assembly.

30. An aircraft according to claim 29, wherein said means comprises each glove assembly having a generally concave upper glove surface relative to a chord line passing through a portion of the wing partially enclosed by said glove, said concavely shaped upper surface having a vertically uppermost surface portion positioned near an intermediate portion of said wing to provide a gradual reduction in air speed over the trailing portion of the modified wing assembly while maintaining a negative coefficient of pressure over the entire of the inboard portion of said modified wing assembly.

31. An aircraft according to claim 25, wherein a trailing edge portion of each wing assembly has a thickness of substantially 0.005C at each wing station located between the aircraft fuselage and an outboard portion of each wing assembly.

32. In a jet aircraft according to claim 25, wherein a trailing edge portion of each wing assembly has a thickness of substantially 0.005C at each wing station located between the aircraft fuselage and an outboard portion of the wing assembly.

33. An improved wing assembly according to claim 32 wherein said trailing edge portion smoothly tapers from a maximum thickness at said fuselage to a minimum thickness at an outboard edge of said wing.

34. An improved wing assembly according to claim 32 wherein said trailing edge smoothly tapers from said fuselage to a point adjacent the beginning of an aileron assembly and maintains a substantially constant thickness over said aileron span.

35. An improved wing assembly according to claim 34 wherein said trailing edge thickness over said aileron span is substantially 0.005C.

36. An improved wing assembly according to claim 32, wherein a thickened lower surface extends generally elliptically from a leading radius of curvature of said wing into contact with said existing lower wing surface.

37. In a jet aircraft of the type having aft fuselage-mounted engine nacelles partially overlapping trailing edge portions of the aircraft's wings, said jet aircraft being of the type which cruises in the transonic regime and including a channel for air formed on each side of the aircraft defined by the upper wing surface extending to its said trailing edge portion, the aircraft fuselage, a pylon support assembly extending between said fuselage and said nacelle, a surface of said nacelle overlapping said wing, and an imaginary plane of symmetry extending from a lower-most outer surface of said nacelle into perpendicular contact with said wing, the improvement which comprises:

the surfaces defining said channel being contoured so as to decrease the ratio of the cross-sectional area at the exit end of said channel to the minimum cross-sectional area of the channel as compared to the ratio of at least 1.0:1.11 for said same areas in an unmodified aircraft of similar configuration, said decrease in said ratio including an increase in said minimum cross-sectional area of said channel and a decrease in said area at the channel exit, said ratio being decreased to a value such that the air passing through said channel at transonic cruising speeds of the aircraft maintains a velocity over substantially the entire length of the channel which is subsonic.

38. In a jet aircraft of the type having aft fuselage mounted engine nacelles partially overlapping trailing edge portions of the aircraft's wings, said jet aircraft being of the type which cruises in the transonic regime, the improvement comprising modifications to said aircraft in which:

a glove assembly is attached to the inboard portion of each wing, each glove assembly including upper and lower smoothly contoured surfaces which join the respective existing upper and lower wing surfaces, with each glove having a bluntly shaped leading edge enclosing a portion of the original leading edge area of the respective wing; and means for smoothly decelerating the air flow speed over each wing aft of the location of maximum negative pressure coefficient in the vicinity of a forward portion of said wing, said means comprising a part of the upper wing surface and said glove assembly jointly forming a portion of concave configuration streamwise at a location substantially opposite the leading portion of the engine nacelle, said means further comprising a portion of increased convexity streamwise forward of said concave portion as compared to the unmodified aircraft, said means acting to maintain a negative coefficient of pressure over the entire inboard portion of said wing at transonic cruising speeds.

39. A glove assembly according to claim 38, wherein said upper and lower smoothly contoured glove surfaces attach to an existing Learjet type wing to define a chamber adaptable for holding additional fuel or the like.

40. An assembly according to claim 38, wherein each glove assembly extends from said fuselage to substantially wing station 82.00, at which point each glove assembly smoothly fairs into a separate one of the existing wings of said jet aircraft.

41. An assembly according to claim 40, wherein each glove assembly smoothly tapers from a maximum cross-sectional size at said fuselage to a minimum cross-sectional size at substantially wing station 82.00.

42. An assembly according to claim 38 wherein said glove assembly includes an upper leading edge radius which uniformly tapers from a maximum value of substantially 1.8 inches at substantially said fuselage to a minimum value of substantially 1.3 inches at wing station 82.00.

43. An assembly according to claim 38, wherein each glove assembly is based on a true chord length of substantially 114.525 inches at wing station 35.433 and includes an angle of incidence of substantially 0.816° C. above a wing reference plane as rotated about the trailing edge;
said leading edge radius having a value of substantially 0.0158C at wing station 35.433 and a value of 0.014852C at wing station 82.00.

44. A jet aircraft according to claim 38, wherein each wing has a trailing edge portion whose thickness tapers from a maximum at said fuselage to a minimum at an outboard edge of said wing.

45. A jet aircraft according to claim 38, wherein each wing has a trailing edge portion whose thickness smoothly tapers from said fuselage to a point adjacent the beginning of an aileron assembly and maintains a substantially constant thickness over said aileron surface.

46. A jet aircraft according to claim 45, wherein each wing has a trailing edge thickness over said aileron in the range of 0.001 to 0.010C.

47. A jet aircraft according to claim 45, wherein each wing has a trailing edge thickness of substantially 0.005C at each wing station located between the aircraft fuselage and an outboard portion of the wing assembly.

48. A jet aircraft according to claim 38, wherein each wing has a thickened lower surface extending in a generally ellipical direction from a leading radius of curvature of said wing into contact with a lower surface of said existing unmodified wing.

49. The jet aircraft of claim 38 in which the trailing edge portion of each wing has a thickness of substantially 0.005 C over the majority of the span of said wing.

* * * * *